Oct. 10, 1950  G. V. NOLDE  2,525,423
CALCULATING MACHINE
Original Filed March 1, 1948  10 Sheets-Sheet 1
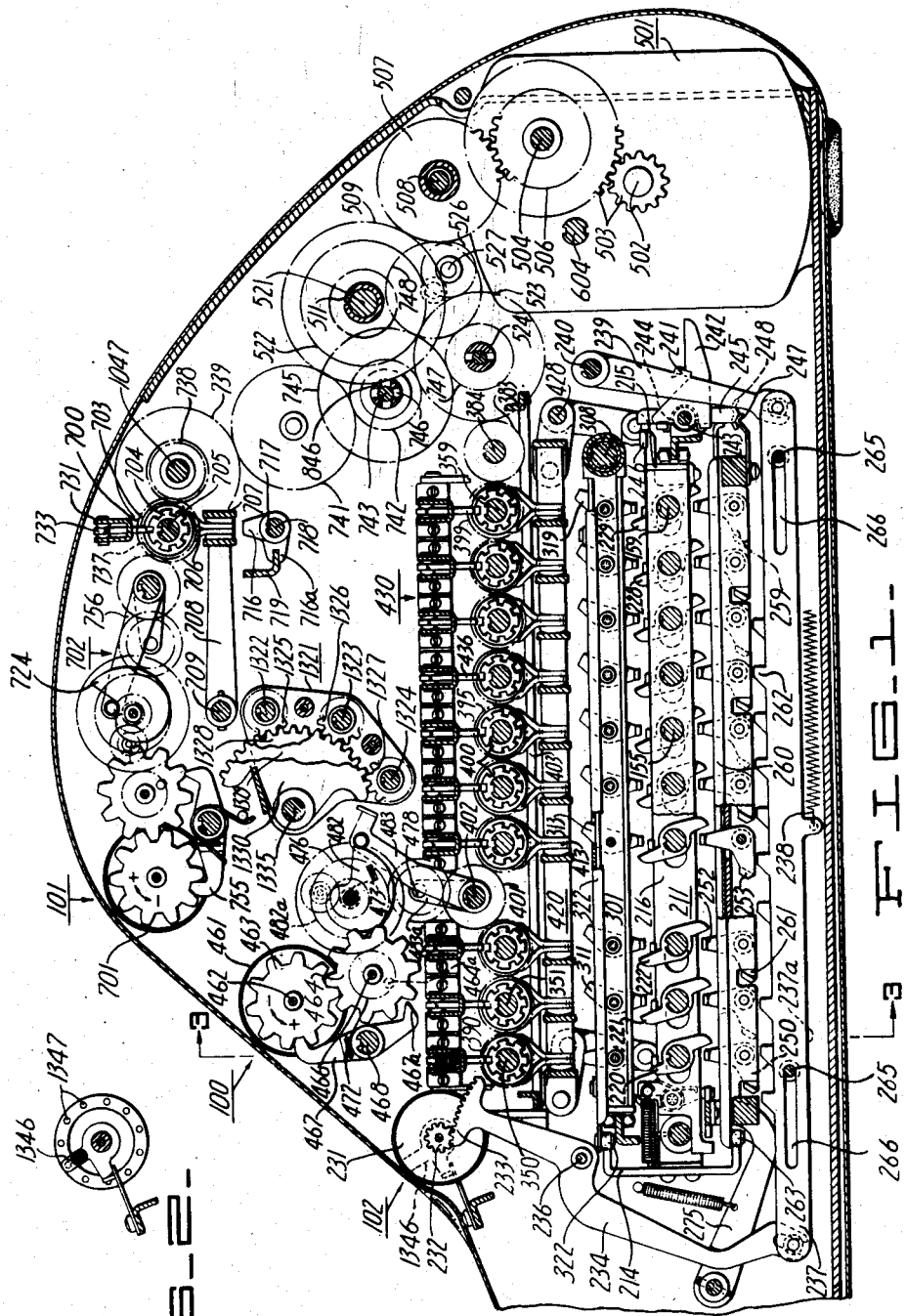
INVENTOR
George V. Nolde
BY
Howard M. Austin.

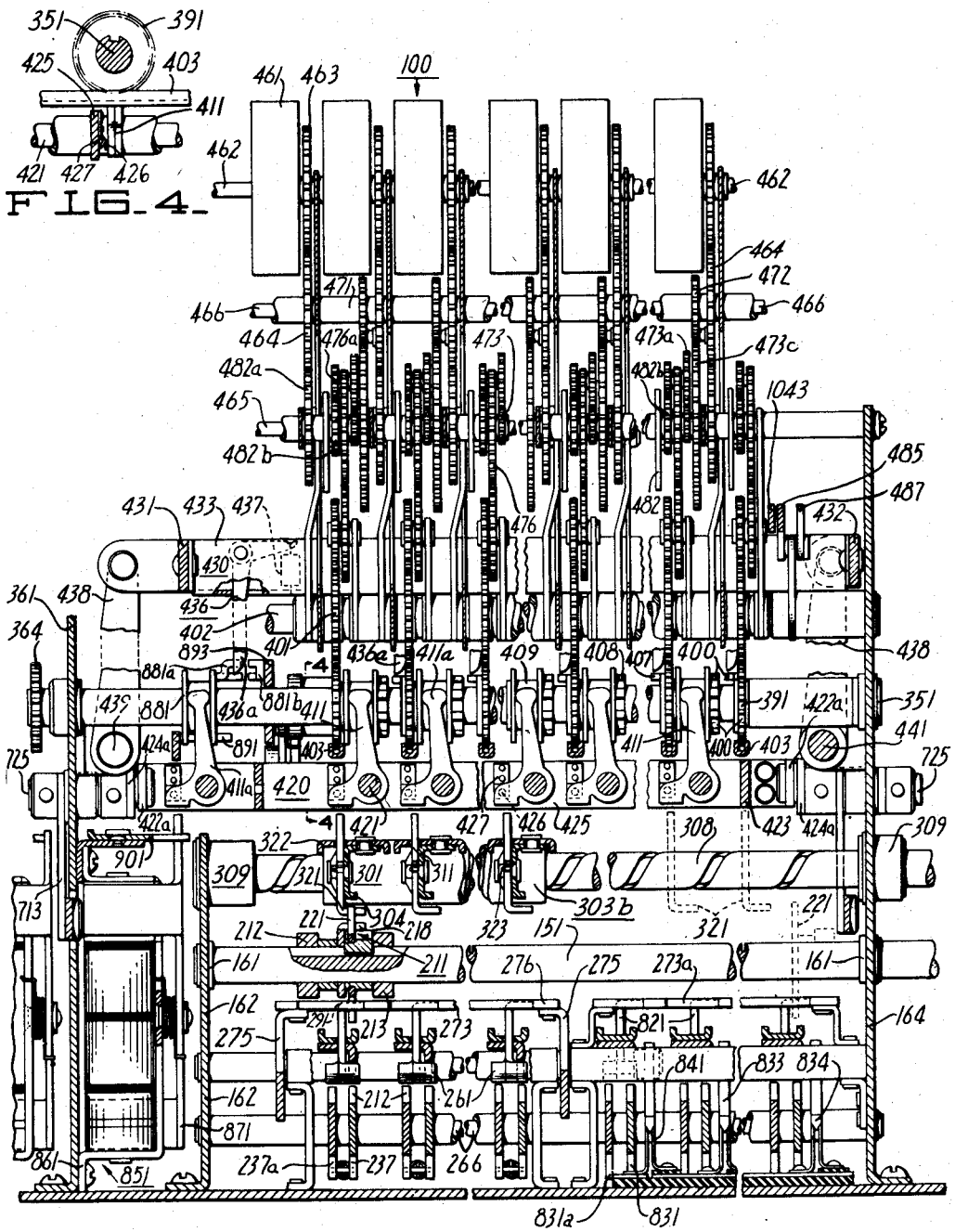

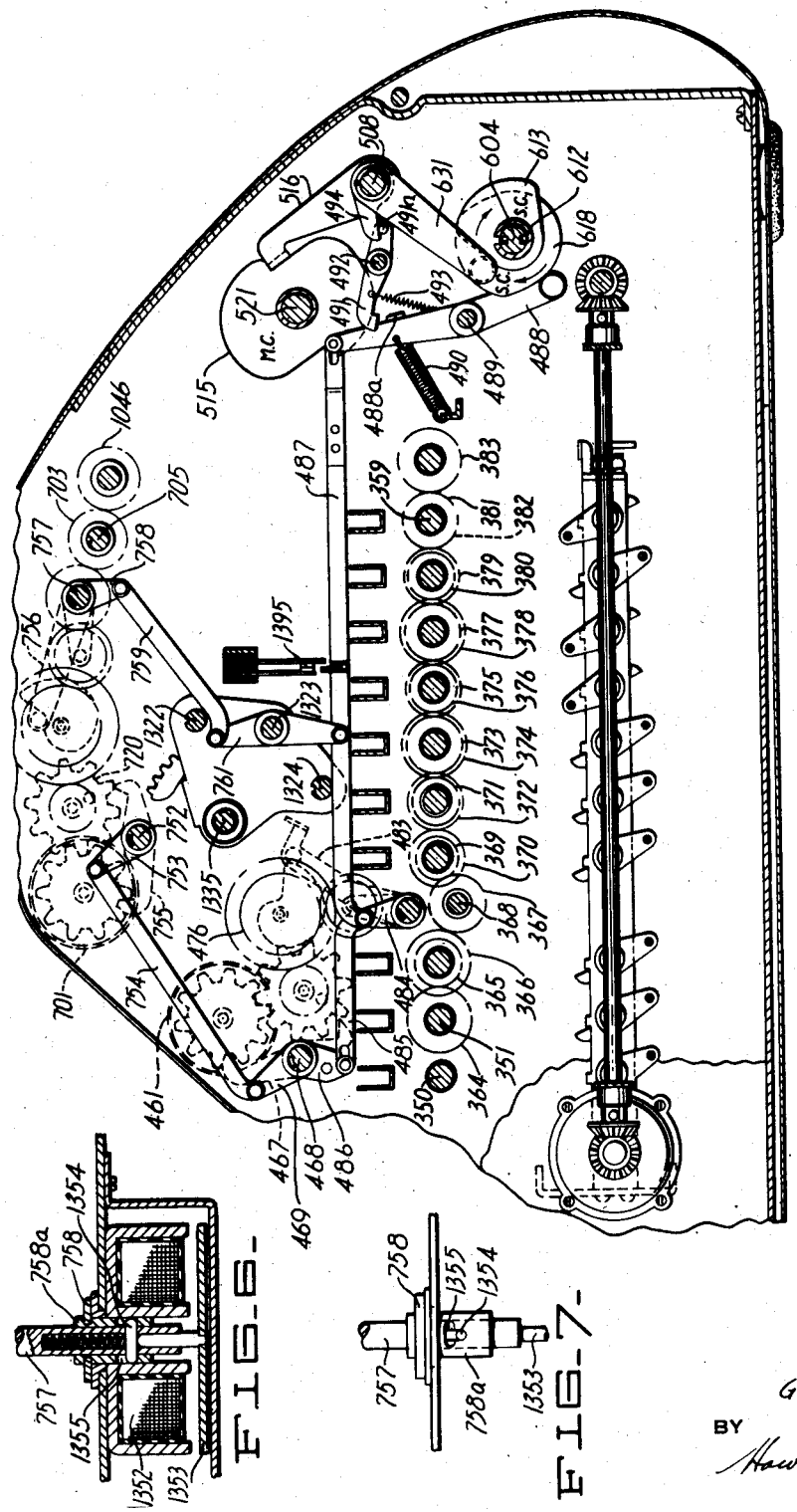

Oct. 10, 1950         G. V. NOLDE         2,525,423

CALCULATING MACHINE

Original Filed March 1, 1948         10 Sheets—Sheet 4

INVENTOR
George V. Nolde
BY
Howard M. Austin.

Oct. 10, 1950  G. V. NOLDE  2,525,423
CALCULATING MACHINE
Original Filed March 1, 1948  10 Sheets-Sheet 5
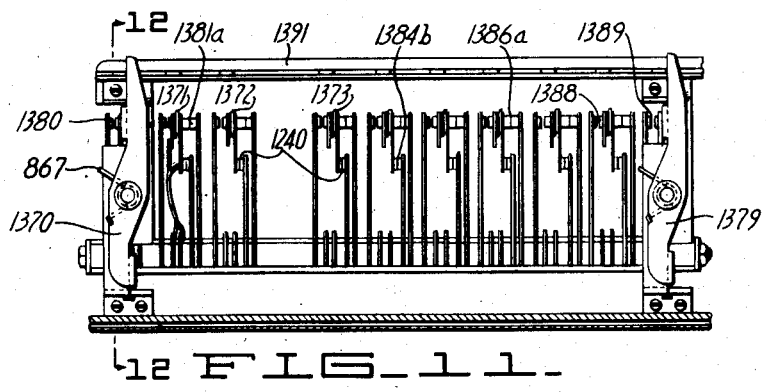
FIG_11_
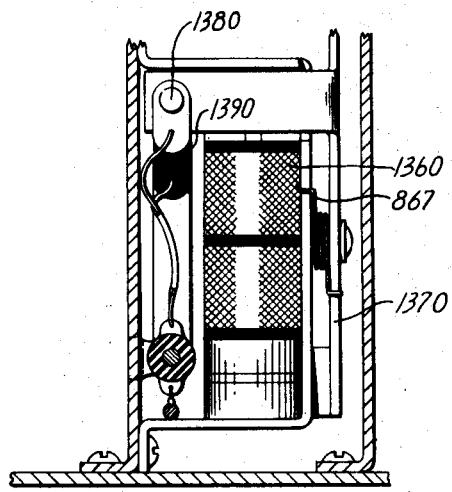
FIG_12_
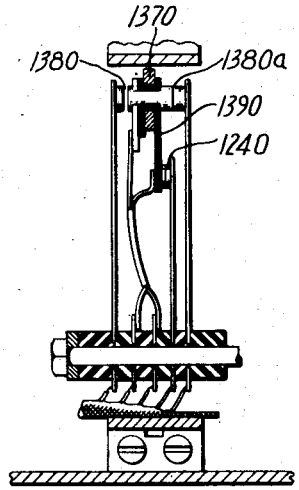
FIG_13_
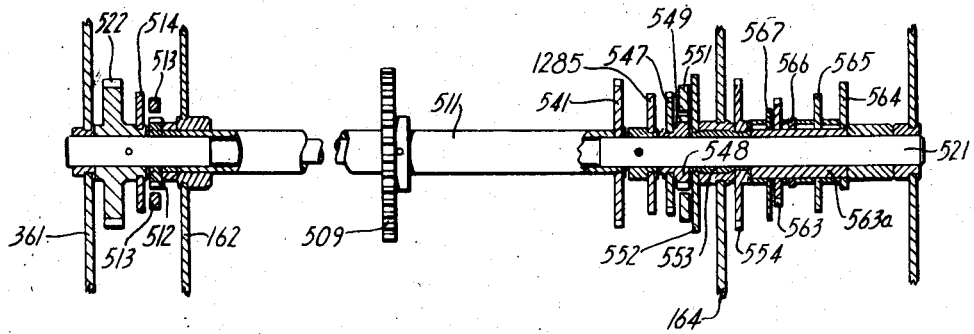
FIG_14_
INVENTOR
George V. Nolde
BY
Howard M. Dustin.

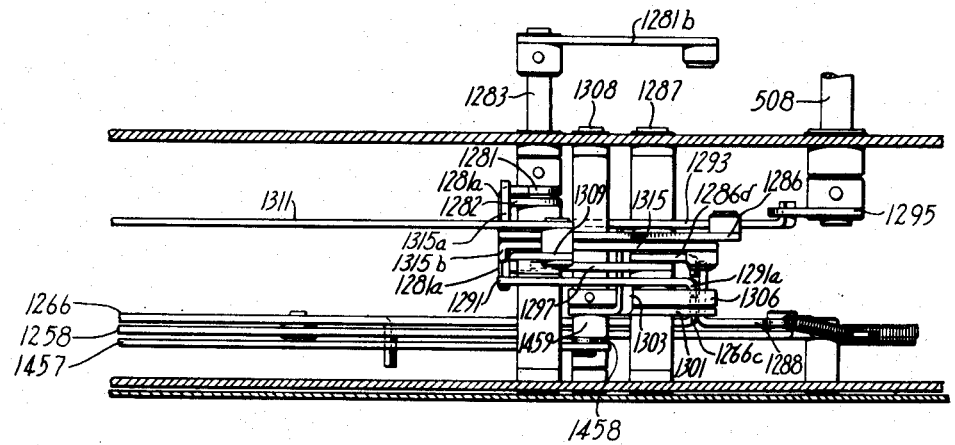
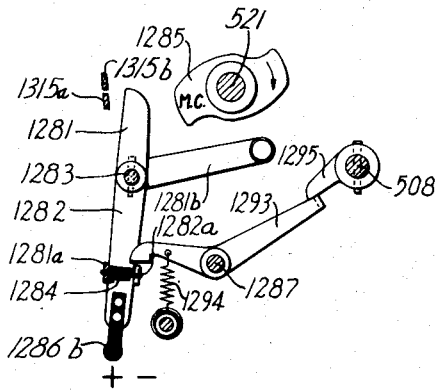
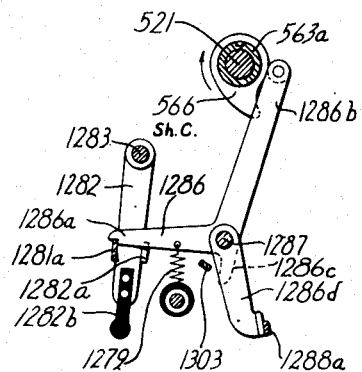
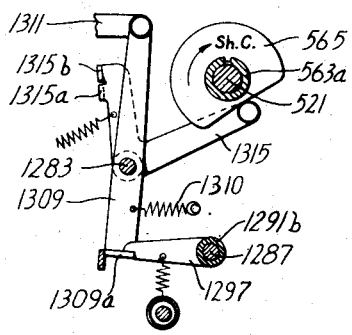
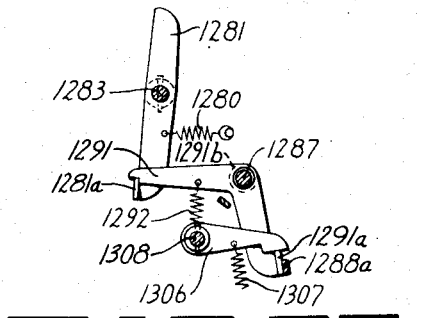

Oct. 10, 1950 — G. V. NOLDE — 2,525,423
CALCULATING MACHINE
Original Filed March 1, 1948 — 10 Sheets-Sheet 8
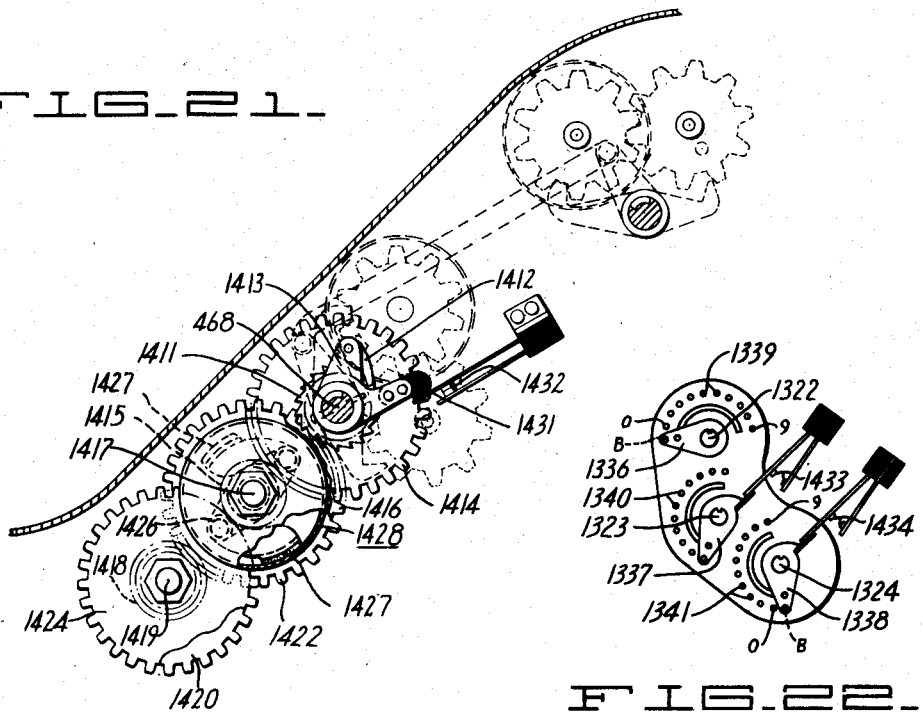
FIG. 21.
FIG. 22.
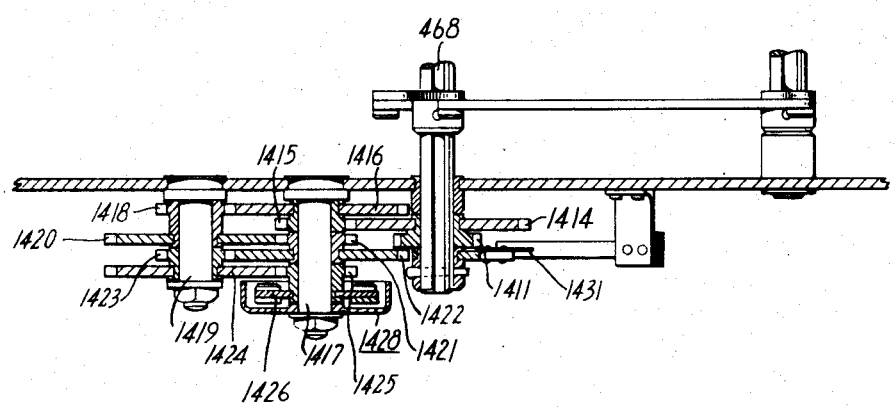
FIG. 23.
INVENTOR
George V. Nolde
BY
Howard M. Dustin

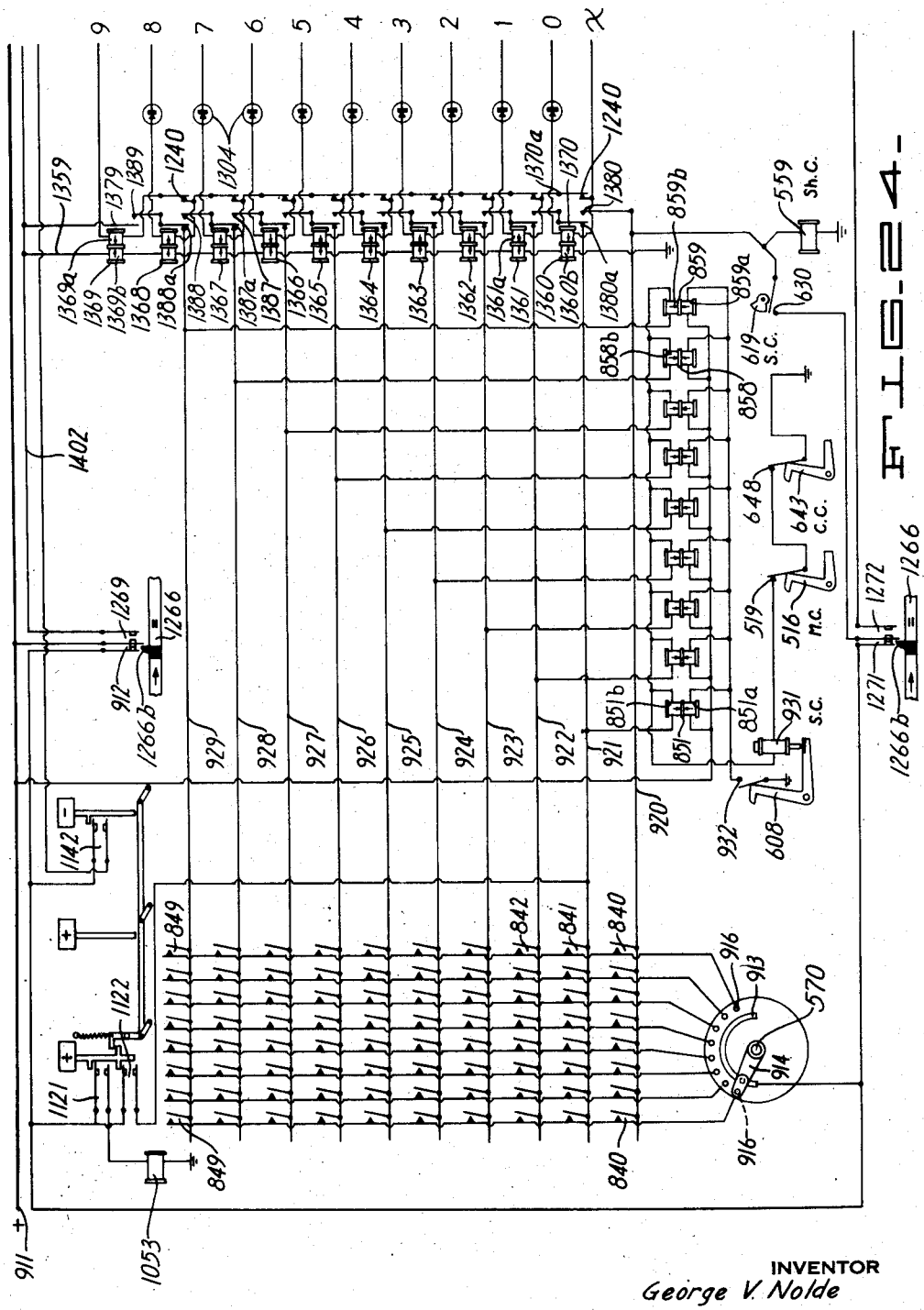

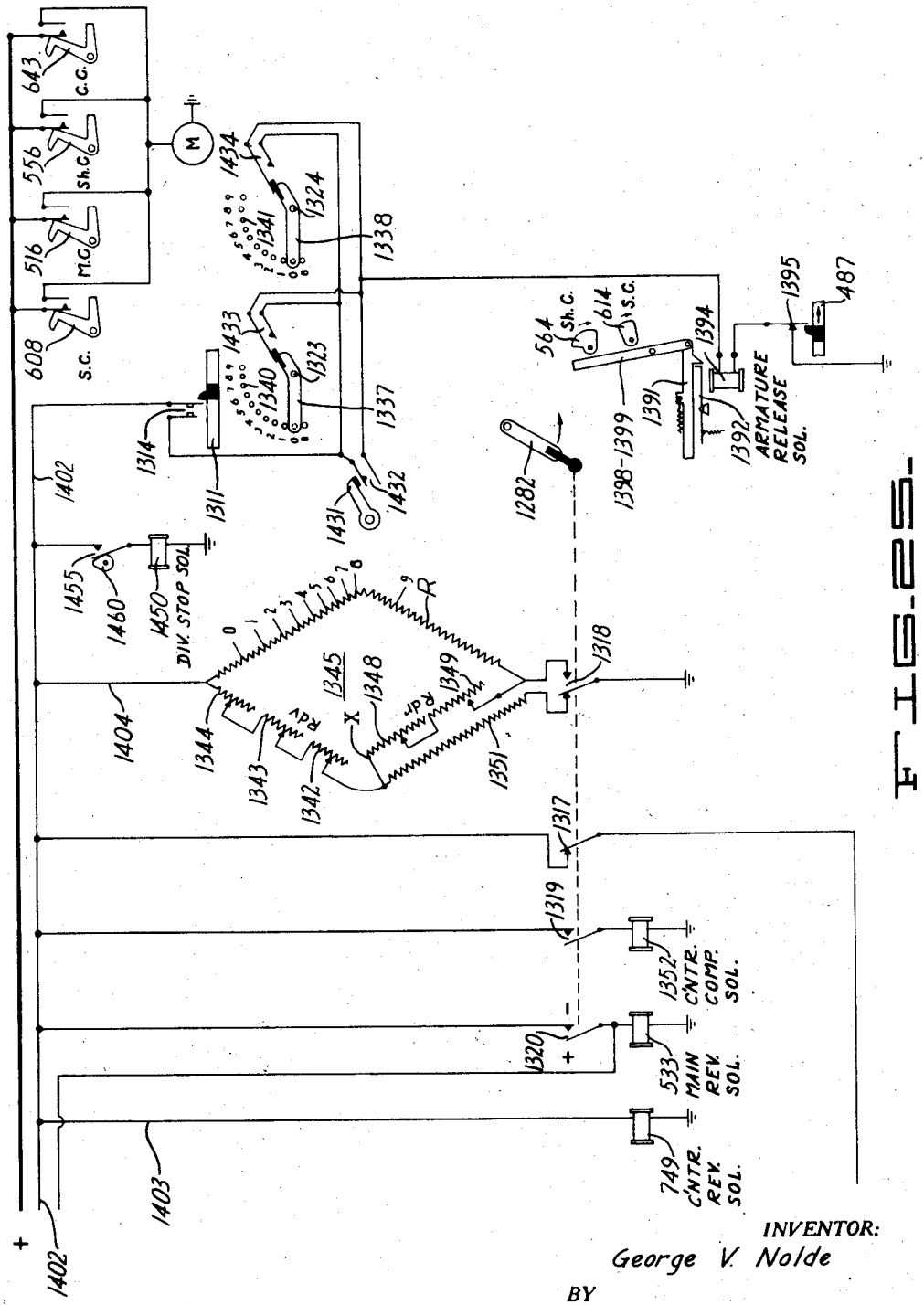

Patented Oct. 10, 1950

2,525,423

UNITED STATES PATENT OFFICE 2,525,423

CALCULATING MACHINE

George V. Nolde, Berkeley, Calif., assignor to Marchant Calculating Machine Company, a corporation of California Original application March 1, 1948, Serial No. 12,232. Divided and this application November 30, 1948, Serial No. 62,760

7 Claims. (Cl. 235—79)

The present invention relates to calculating machines and particularly concerns improvements in division control mechanisms.

This case is a division of the application, Serial Number 12,232, filed March 1, 1948. The machine disclosed in said application is adapted for simultaneous operation of the actuating and shifting mechanisms. Each numeral wheel of the accumulator or dividend register is permanently associated with a respective actuator. Each ordinal actuator comprises a series of ten selectively engageable differential clutches representing the values "1" to "9" and "0," respectively. The clutches "1" to "9" are provided for driving the numeral wheel by differential amounts while the "0" clutch prevents operation of the numeral wheel by the actuating mechanism. The clutches are selectively engaged under the control of a plural order selection storing carriage which comprises, in each order thereof, ten selectively settable clutch engaging elements. These elements are set to clutch engaging position by a single order selection set-up carriage which is controlled by the numeral keys of a ten-key keyboard. The selection storing carriage is effective prior to each actuating operation to cause engagement of a selected one of the differential clutches.

The selection storing carriage comprises a fewer number of orders than the accumulator, and is shiftable relative to the accumulator numeral wheels and their respective clutches. Once a differential clutch is engaged by the selection storing carriage, it remains engaged throughout an ordinal actuating operation, during which the selection storing carriage is shifted to another order of the actuating mechanism in preparation for the next actuating operation. The present invention utilizes this mechanism in the performance of division calculations. The above mentioned simultaneously operable actuating and shifting mechanism is fully described in said application to which reference may be had for a full understanding of the operation thereof.

A dividend sensing mechanism is provided which is effective in each ordinal operation of the division mechanism to sense the value of the dividend, or remainder of the dividend as the case may be, while a divisor sensing mechanism senses the value of the divisor. The respective values so sensed are compared in a pre-estimating mechanism of the type shown and disclosed in the Avery application, Serial Number 81,501, filed March 15, 1949, to obtain an estimated quotient digit, the representation of which controls the number of cycles of subtractive actuation of the current ordinal operation.

The adjustment of the pre-estimating mechanism preferably is such that the machine will pre-estimate the correct quotient digit. In some cases, however, it may pre-estimate one more than the correct quotient digit, in which case the divisor is subtracted once too often from the current dividend and an overdraft results. At the end of each subtractive actuation, the value of the remainder is sensed to determine whether or not an overdraft has occurred. If an overdraft condition is sensed, a corrective plus stroke is initiated, during which a shifting operation is initiated and completed. If an overdraft condition is not sensed, then a corrective plus stroke is not required and instead an ordinal shift is automatically initiated, at the conclusion of which the next ordinal division operation is automatically started.

The dividend register is of the crawl carry type by means of which partial tens carry increments are entered simultaneous with digitation. Then upon completion of digitation these partial tens carry increments are backed out to align the numeral wheels. For this purpose a "correction at entry" compensating mechanism is provided. Normally the aligning operation does not cause a delay in division operations. In case of an overdraft, however, a carry wave results, during which the numeral wheels are changed from zeros to nines in the manner described in U. S. patent, Number 2,222,164 issued to Harold T. Avery, November 19, 1940, and which carry wave delays the alignment of the numeral wheels. Since the dividend value determining means is adapted for sensing the value of the dividend when the numeral wheels are in aligned position, a mechanism comprising a part of the present invention is provided for delaying each dividend value sensing operation for a period of time sufficient to allow any possible carry wave to be completed. In many cases, however, there will be no overdraft to delay the alignment of the numeral wheels; therefore, a second mechanism is provided to supersede the delay mechanism and initiate a sensing operation when the values standing in certain orders of the dividend register indicate that a carry wave through those orders is not possible.

The present invention is based on three principles, namely: (1) delaying a dividend sensing operation for a length of time sufficient to permit a possible carry wave to occur in a crawl carry dividend register, (2) superseding the delaying mechanism and initiating a sensing operation when certain orders of the dividend register stand at values that indicate a carry wave is not possible, and (3) initiating a simultaneous plus stroke and shifting operation under the control of the dividend sensing mechanism when the latter senses an overdraft.

A principal object of the present invention is to shift a dividend value determining device from one order of the dividend register to the next lower order thereof during a value entering operation of the actuators.

Another object is to shift the actuator control mechanism from one group of orders of the actuating means to the next lower group thereof during a corrective plus stroke of the actuating means.

It is still another object to delay the above mentioned sensing and shifting operations and other operations incident to division calculations when a carry wave is possible and to eliminate such delays when a carry wave is not possible.

A further object of the invention is to provide a calculating machine of the above character embodying an improved form of pre-estimation division mechanism.

Other objects and advantages of the invention will be apparent from the following description of a preferred embodiment of the invention, as illustrated in the accompanying drawings, in which:

Fig. 1 is a longitudinal section of the machine as viewed from the right showing the general arrangement of the machine with the exception of the keyboard which has been omitted.

Fig. 2 is a right side detail view of the variable resistance contacts associated with a numeral wheel of the divisor factor indicator.

Fig. 3 is an enlarged sectional elevation taken on line 3—3 of Fig. 1.

Fig. 4 is a fragmentary section as seen from the left side of the machine and taken as indicated by the line 4—4 in Fig. 3.

Fig. 5 is a right side view of the machine with certain parts omitted, illustrating a pair of setting clutch cams and related control mechanisms operated thereby.

Fig. 6 is an enlarged sectional plan view of the mechanism for disabling the control of the compensating arms of the counter register.

Fig. 7 is a detail view of a part of the mechanism shown in Fig. 6.

Fig. 11 is a right side view of the control switches associated with the bridge magnets of the division mechanism.

Fig. 12 is an enlarged front view of a bridge magnet taken as indicated by the line 12—12 in Fig. 11.

Fig. 13 is an enlarged view of a portion of the switch mechanism shown in Fig. 11.

Fig. 14 is a front view, partially in section, of the main clutch, the shift clutch, and associated mechanism.

Fig. 16 is a fragmentary plan view of a portion of the division control mechanism.

Figure 15:
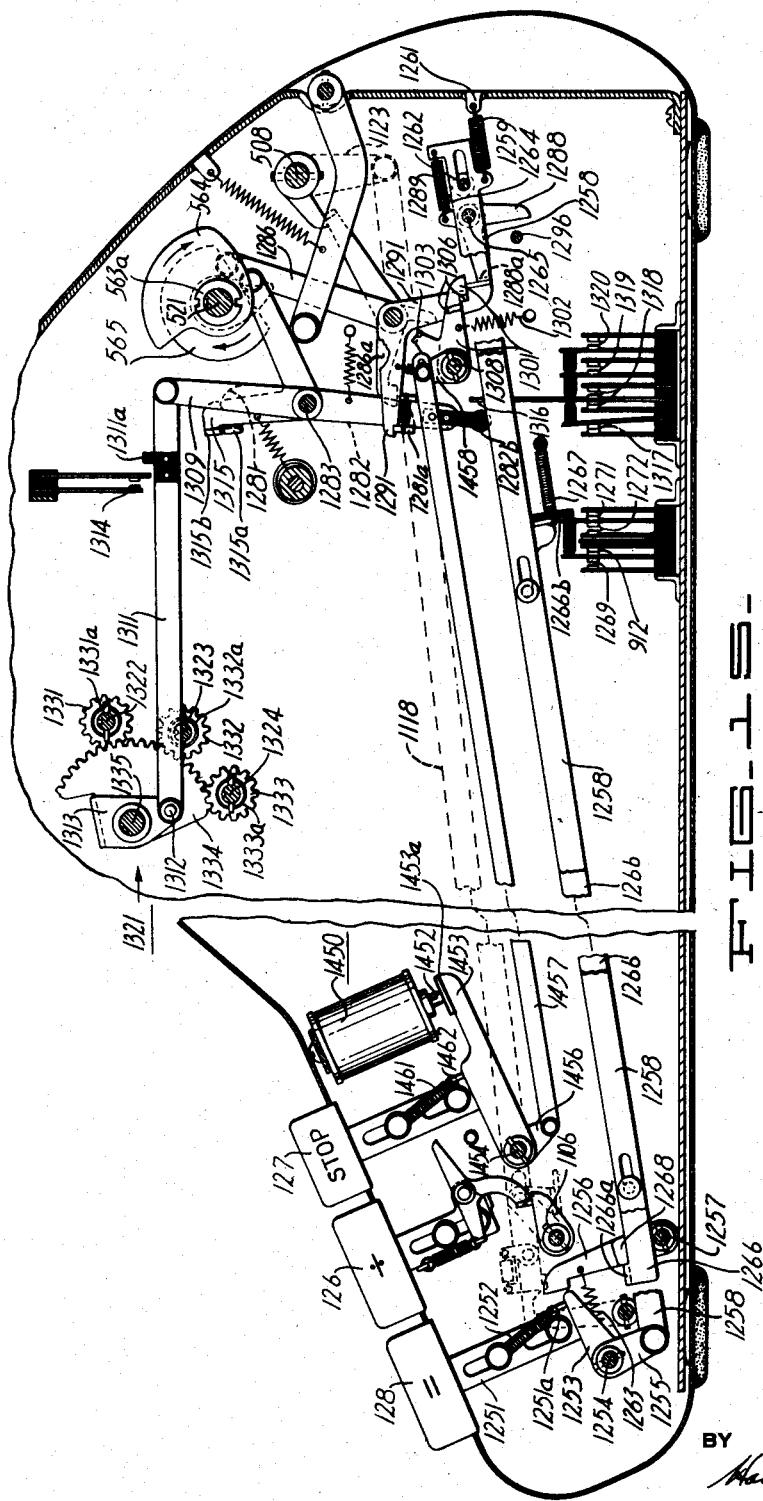
Fig. 15 is a right side view, partially in section, showing the division control keys and their related division control mechanisms.

Figs. 17–20 inclusive are fragmentary right side views of portions of the division control mechanism shown in Figs. 15 and 16.

Fig. 21 is an enlarged fragmentary section, as viewed from the right, showing the control mechanism for delaying return of the centralizer pawls at the ends of a digitation operation.

Fig. 22 is a left side view of the switching mechanism which is set under control of a dividend sensing carriage and which is effective to adjust the dividend resistors of the quotient estimating mechanism.

Fig. 23 is a sectional plan view of the mechanism shown in Fig. 21.

Figs. 24 and 25, taken together, form a schematic wiring diagram of the electrical controls of the calculating machine.

SELECTION MECHANISM

The machine embodying the present invention includes a ten key keyboard (not shown) for entering factor digits into the machine. The numeral keys of the keyboard are operable to rock the selection shafts 150 to 159 (Fig. 1). A plurality of setting levers 220 to 229 are slideably keyed to the respective shafts 150–159 and are carried by a shiftable single order set-up carriage 211. The setting lever which is rocked by its respective key, rocks a blocking lever 310 to 319 into a position in which it later causes engagement of a respective one of an ordinal row of clutches 400. The downwardly extending arm of the setting lever 220 to 229 is concurrently operable to set a respective one of a plurality of blocking interponents 250 to 259 which in turn control the movement of a selection bar 237—237a and limit the rotation of the factor indicator numeral wheel 231 to a position corresponding to the value of the key depressed. The depression of a numeral key also causes escapement of the set-up carriage 211 which moves one order toward the right and into alignment with the next ordinal row of blocking levers 310 to 319 and the corresponding ordinal row of interponents 250 to 259 whereupon depression of a selected numeral key will cause a similar setting of the next digit into the storing carriage 301 and the next lower order numeral wheel 231, all as described in detail in the application Serial Number 12,232 of which this is a division. Reference may be had to the above application for a complete disclosure of parts of the machine not specifically described herein; it being noted that parts shown in the drawings, but not described in this specification will be found to bear the same reference numerals used to identify the corresponding parts in said application. The parts identified by the same reference numerals in the drawings of this application operate exactly as shown and described in said application.

ACTUATORS

The above mentioned blocking levers 310 to 319 are effective to control the engagement of a respective one of the differential clutches 400. There is a row of such clutches for each accumulator numeral wheel 461 (Fig. 3), there being approximately twice the number of accumulator or dividend numeral wheels as there are orders in the selection storing carriage. During multi-order operations such as division, which require changing the ordinal relationship between the divisor and dividend factors or the remainder of the latter, the storing carriage 301 which contains the divisor factor is shifted one order toward the right during each ordinal operation to associate the factor set therein with the successively lower orders of the register and the numeral wheel clutches 400. The differential clutches 400 each include a driving and a driven element. The driving elements 408 are mounted for limited sliding movement upon their respective shafts 350 to 359, and in each order one of the elements is moved into engagement with a driven element 407 by an associated fork 410–419. These forks are carried by a clutch engaging frame 420 which is mounted for up and down movement under the control of a setting clutch. This clutch operates prior to each operation of the main clutch. Downward movement of the differential clutch engaging frame 420 brings the substantially horizontal lower surface of the fork against one of the blocking levers 310 to 319 previously moved into blocking position by a numeral key, and in so doing the fork is rocked clockwise to engage the teeth of the clutch driving element 408 with the single tooth of the clutch driven element 407 and thus cause engagement of the selected one of the differential clutches.

Concurrent with the operation of the clutch engaging frame 420, a clutch disengaging frame generally designated at 430 (Figs. 1 and 3), is moved toward the left as viewed in Fig. 3 by the setting clutch to disengage any previously set clutches. Frame 430 is returned toward the right before the clutch engaging frame 420 is moved upwardly to ineffective position so as not to disengage any clutches currently being set.

The selection storing carriage 301 (Fig. 1) is suitably mounted in the machine for shifting relative to various orders of the ordinally arranged clutches 400. Shifting is effected by a worm shaft 308 which is rotated by operation of a shift clutch described hereinafter.

For convenience the clutches shown in the various parts of the drawings and referred to hereinafter are identified by characteristic letters such as M. C. for main clutch, S. C. for setting clutch, Sh. C. for shift clutch and C. C. for clear clutch. The cams driven by the respective clutches and the solenoids and clutch control dogs which cause engagement and disengagement of the respective clutches are also identified by similar letters.

The gear train on the ends of shafts 351–359 is such that proportional movements are transmitted to the shafts and their respective clutches 400 in ratios according to the values "1" to "9," respectively so that when one of these driving movements is transmitted to a related numeral wheel 461 (Fig. 1) of the register 100 there will be produced from 1 to 9 digital increments of rotation of that numeral wheel in accordance with the digital value to be entered in that order. If a zero is selected in a given order, the "0" clutch 400 is engaged and the fixed shaft 350 serves as a lock to prevent rotation of the numeral wheel during idle rotation of the other shafts 351–359. A spring detent 427 (Fig. 4) fixed to a cross member 425 of the clutch engaging frame cooperates with a pin 426 carried by the clutch engaging fork to hold the fork and a respective clutch 400 in either its engaged or disengaged position.

Each driven element 407 (Fig. 3) of the clutches 400 carries a respective gear 390–399 (Fig. 1), and each ordinal series of gears 390–399 is enmeshed to form an idler gear train. Enmeshed with the idler gear train is a drive receiving gear 401 journaled on a shaft 402. The drive from gear 401 is transmitted to an associated numeral wheel 461 through the crawl carry gearing as described in said application Serial Number 12,232. Upon engagement of the #1 clutch 400 for example, the main clutch drives shaft 351, the ordinal clutch 400 associated therewith, gear 391, the gear 401 and the crawl carry gearing to advance the numeral wheel one digital increment.

From the foregoing description of the selection mechanism, it will be apparent that the provision of the same or substantially the same number of orders in the actuating mechanism as there are in the accumulator, together with the provision of a multi-order selection storing carriage which can be used to enter a multi-order factor in various relative ordinal positions of the actuating means, enables the setting of a factor into any group of orders of said actuating means. Since the engagement of the clutches 400 is maintained during an actuating operation, the selection storing carriage may be shifted to the next order of the actuating means during the operation of the latter. In this way a substantial saving in the over-all operating time of the machine in performing a calculation is made possible.

DIVIDEND REGISTER

The dividend register 100 (Figs. 1 and 3) is of the "crawl carry" type disclosed in Patent No. 2,222,164, issued November 19, 1940. Each dividend register numeral wheel 461 has associated therewith a graduated member in the form of a snail cam 482 which is advanced with the numeral wheel and which forms a mechanical representation of the value standing in said wheel. As will be shown hereinafter, the peripheries of certain higher order snail cams are "sensed" to determine the approximate value standing in the dividend register.

Also associated with each numeral wheel is a pawl 467 (Fig. 1) which operates to centralize the numeral wheel after actuation thereof, and a compensation arm 483 which cooperates with the snail cam 482 to form a part of the numeral wheel aligning mechanism. The latter mechanism is of the type disclosed in Patent No. 2,089,682, issued Aug. 10, 1937, and by means of which partial carry increments are backed out of a numeral wheel through adjustment of the digital entry leg of the crawl carry gear train. During the previously mentioned setting clutch operation, the setting clutch cam 618 (Fig. 5) operates through the linkage shown to move both the centralizer pawls 467 and the compensation arms 483 of the dividend register to inactive positions. Pawls 467 and arms 483 are then locked in this position throughout operation of the actuating mechanism to permit free rotation of the numeral wheels and the snail cams, respectively. The centralizer pawls 755 and the compensation arms 756 for a counter register, described hereinafter are similarly moved to, and locked in disabled positions all of which is described in the application S. N. 12,232.

REVOLUTIONS COUNTER

The revolutions counter disclosed herein as the register 101 (Fig. 1) is of conventional crawl carry type and with the exception of the specific manner in which the numeral wheels are aligned it is generally similar to the accumulator or dividend register 100.

The register 101 includes the numeral wheels 701 each of which is driven by a respective drive gear 703 through a planetary gear train indicated generally at 702. Each gear 703 is driven by a respective ordinal clutch 700 similar to the ordinal clutches 400 of the actuating mechanism for the dividend register, there being only one clutch 700 for each order of the counter register in contrast to the plurality of clutches 400 for each order of the accumulating mechanism.

A shiftable interponent 716 (Fig. 1) similar in operation to the blocking levers 310–319 of the selection storing carriage 301 is provided to cause engagement of one of the ordinal counter clutches 700. A clutch engaging frame 707 and a clutch disengaging frame 731 are provided for the counter clutches 700 and the operation of these frames is similar to the corresponding frames 420 and 430 for the clutches 400. The arrangement is such that engagement of a clutch 700 causes a single count to be entered into an order of the counter register during each cycle of operation of the actuating mechanism. The interponent 716 is driven by a worm shaft 718 for shifting of the interponent from one order of the counter register to the next so that successive clutches 700 may be engaged. Such engagement causes successive numeral wheels 701 to count the number of times the multi-order divisor factor is subtracted from the dividend numeral wheels and thereby indicate the quotient digits.

MOTOR DRIVE MECHANISM

The motor drive mechanism of the present machine is the same as shown in application S. N. 12,232 and includes an electric motor from which four separate drive trains are provided through a main clutch, a shift clutch, a setting clutch and a clear clutch.

MAIN CLUTCH

The main clutch 515 (Fig. 5) drives through a train of gears to rotate the differential actuator shafts 351–359 (Figs. 1 and 5) in amounts proportionate to the values "1" to "9." Shaft 350 is locked against driving as previously mentioned.

The main clutch also serves through a suitable drive train shown in said application S. N. 12,232 to drive one of the clutches 700 and to enter a single increment of count into a selected order of the counter register 101 during each cycle of operation of the main clutch.

CYCLIC CONTROL OF ACTUATING MECHANISM

The clutch control dog 516 (Fig. 5) for the main clutch 515 is rocked to clutch-engaging position by the setting clutch cam 613 and is held in clutch-engaging position by a latch (not shown). The latch and its related control devices, which are all fully described in the last mentioned application is selectively operable to hold the main clutch dog in engaged position for a pre-determined number of cycles of operation of the main clutch. Such selective operation of the clutch is under the control of a series of electromagnets 851 to 859, diagrammatically illustrated in Fig. 24. Each magnet has a bias winding 851a to 859a, the purpose of which is described in the last mentioned application, and also an actuating winding 851b–859b, the energization of one of which causes the above mentioned selective operation of the latch. Energization of a respective actuating winding is controlled by a quotient pre-estimation mechanism including the Wheatstone bridge generally indicated at 1345 (Fig. 25) and the relays 1360 to 1369 (Fig. 24) connected across this bridge. The Wheatstone bridge and the relays are fully described in the section on division operations.

MAIN REVERSE MECHANISM

A main reverse drive unit is settable under the control of a main reverse magnet as disclosed in said application S. N. 12,232, to reverse the direction of operation of shaft 524 (Fig. 1) and to reverse the drive from the main clutch to the actuator shafts 351–359. A similar counter reverse unit is settable under the control of a counter reverse magnet to reverse the direction of operation of shaft 746, to reverse the drive to the drive shaft 705 and the clutches 700 for the counter register. The respective controls over these reverse units will be described more fully in the section on division operations.

SHIFT CLUTCH

The shift clutch 550 (Figs. 8 and 9) operates to effect ordinal shifting movement of some of the component parts of the machine including the selection storing carriage 301 (Fig. 1) and the ordinal control interponent 716 of the revolutions counter, as well as various elements of the divison control mechanism, described hereinafter. The shift clutch is a half revolution clutch and corresponds to the clutch of the same number in the parent application.

The engagement of the shift clutch 550 (Fig. 8) is under control of a shift control solenoid 559 and a clutch control dog 556. Each cycle of operation of the half-revolution shift clutch 550 (Fig. 9) drives the cams 564, 565, 566 and 567 a full revolution. The operation of the cams 564, 565 and 566 will be described in greater detail hereinafter in conjunction with the associated mechanisms with which they cooperate.

Cam 567 (Fig. 10) forms a part of the general shift drive of the machine and, with other associated mechanisms, serves to advance certain of the shiftable parts of the machine one step for each cycle of movement of the shift clutch. The shift clutch cam 567 (Fig. 10) operates through a follower 568 and an actuating pawl 569 to advance a shift ratchet 571 one step for each cycle of shift clutch operation, the pawl 572 engaging successive teeth of ratchet 571 to hold the latter in its advanced position.

Each time the ratchet 571 is advanced one step, various ordinally shiftable elements of the machine are shifted one order. These elements include the selection storing carriage 301 (Fig. 1) shiftable by means of the worm shaft 308, and the counter actuating means interponent 716 shiftable by means of the worm shaft 718. The shift drive to the worm shafts 308 (Fig. 8) and 718 is transmitted from ratchet 571 by respective gear trains described in detail in the last mentioned application. The drive from the above described pawl and ratchet mechanism is also transmitted through means hereinafter described to effect shifting of a division sensing carriage.

SETTING CLUTCH

A setting clutch which is fully described in the application S. N. 12,232 operates to condition the machine for subsequent operation under control of the main clutch.

The setting clutch drives the sleeve 612 (Fig. 5) to rotate various operating cams including cam 618 which operates through follower 488 and the linkage shown to move the numeral wheel centralizer pawls 467 and 755 and the compensation arms 483 and 756 to the disabled positions described hereinbefore. Setting clutch cam 613 operates through follower 631 and shaft 508 to move the main clutch dog 516 to clutch engaging position. As shown diagrammatically in Fig. 24, the setting clutch cam 619 closes a switch 630 in the circuit of the shift clutch solenoid 559 during the cycle of operation of the setting clutch. As will be disclosed hereinafter another setting clutch cam is operative during division operations to control certain elements of the division mechanism.

CLEAR CLUTCH

A clear clutch is provided to normalize all or selective portions of the machine depending on selective operation of various clear keys and the mechanisms controlled thereby. In division operations the clear clutch becomes engaged as a result of a dividend entry operation to return the selection storing carriage 301 and the selection set-up carriage 211 to their initial positions and also to clear the storing carriage of any value set therein, all as is fully described in the application S. N. 12,232.

DIVISION

The division mechanism of the instant invention is of the general type disclosed in the copending application of Harold T. Avery, S. N. 81,501, filed March 15, 1949, for Calculating Machines. As fully explained in the above noted Avery application, the division control is exercised in accordance with a process of pre-estimation division by means of which the divisor is compared with the dividend to obtain an estimated quotient digit which is either the correct quotient digit or one greater than the correct quotient digit. At the end of an ordinal division or subtracting operation, the remainder is sensed to determine whether an overdraft has occurred due to an over-estimation of the quotient digit. If the correct quotient digit was estimated, a relative shifting is effected between the current dividend value standing in the register 100 and the divisor, the latter being represented by the value standing in the selection storing carriage, while if the quotient figure has been over-estimated a corrective addition cycle occurs during which time the shifting of the selection storing carriage is effected.

In the performance of division operations, the above described general control operations occur in determining each quotient digit until the capacity of the machine has been reached or until the division stop key 127 is operated to terminate the division operation at the end of a desired ordinal division.

The present type of machine differs from the machine shown in the above noted Avery application in that a "crawl type" tens transfer registering mechanism and a modification of the "proportional gear" actuating mechanism is used instead of the simultaneous transfer mechanism and the dial clutch actuators disclosed in said application. This modification of the transfer and actuating mechanisms permits of the simultaneous operation of the shifting and actuating mechanism described hereinbefore as well as the high cyclic speeds previously attained by such proportional gear actuating mechanisms but requires certain changes in the division sequence as will be described hereinafter.

DIVIDEND ENTRY

The dividend may be entered into register 100 by depression of a dividend entry (+) key or it may be some value previously accumulated in the register.

Depression of the dividend entry key 126 (Fig. 15) causes a value previously set up in the selection storing carriage 301 (Fig. 1) to be entered into the dividend register 100 as described fully in the aforementioned application S. N. 12,232, and after such entry the key 126 causes operation of the clear clutch to clear the counter register 101 and restore both the selection storing carriage 301 and the selection set-up carriage 211 to their respective initial positions. In case an accumulated value is to be used as a dividend, then certain respective clear keys are depressed to clear the counter register 101 and restore the carriages 301 and 211 to initial positions.

The divisor is then entered into the selection storing carriage 301 (Fig. 1) in the usual manner through the ten-key keyboard and the value selected is shown in indicator 102.

DIVISION START OR EQUAL KEY

The operation of the division start or equal key 128 (Fig. 15) serves several functions including the enabling of the division control mechanism, the disabling of a portion of a multiplication control mechanism and the conditioning of the division control mechanism for stopping the machine at the end of the division operation.

Referring to Fig. 15, the stem 1251 of the key 128 is urged to raised position by a spring 1252 and carries an ear 1251a overlying an arm 1253 pinned to a shaft 1254. Also associated with the ear 1251a is a spring-urged latch 1256 carried by a shaft 1257 and serves to latch the key 128 in depressed position as disclosed hereinafter.

The arm 1253 (Fig. 15) and the shaft 1254 form part of a division setting control linkage including a depending arm 1255 fixed to the shaft 1254 and which arm 1255 is pivotally connected to a rearwardly extending division control link 1258. The latter is slotted at its rearward end to engage a support stud 1262 and is urged to the right as viewed in Fig. 15 by a spring 1259 connected between the link and a suitable frame bracket 1261.

To enable latching of the division start key in depressed position and to enable the division control mechanism and simultaneously disable the multiplication control mechanism, the slide 1258 carries an auxiliary control slide 1266 which is mounted by pin and slot connections on the slide 1258 for limited movement relative thereto. Slide 1266 is urged to the right as viewed in Fig. 15 by a spring 1267. At its forward end the slide 1266 has a laterally extending ear 1266a lying in front of an arm 1268 pinned to the shaft 1257 for the key latch 1256, so that when the slide 1266 is moved to the left, arm 1268 and the latch 1256 can move under the influence of the latch spring 1663 to overlie the ear 1251a of the key 128. When key 128 is latched in depressed position, slide 1258 is locked in its leftmost position through ear 1251a and arms 1253 and 1255.

A bell crank 1288 is freely mounted for limited rocking movement on a stud 1265 carried near the rightmost end of slide 1258, and a spring 1289 urges the bell crank 1288 clockwise against an ear 1264 of the slide. An ear 1288a on the leftmost arm of the bell crank is laterally bent and lies adjacent an ear 1266c (Fig. 16) of slide 1266 so that upon the leftward movement of slide 1258, slide 1266 will be moved therewith. It will be noted that ear 1288a is also operatively related to respective ears on levers 1291 and 1286d as is more fully described hereinafter.

Slide 1266 controls the enabling and disabling, respectively, of the division and multiplication control mechanisms through an insulated depending arm 1266b (Fig. 15) which, upon movement of the slide to the left, is adapted to open the normally closed switch 912 (Figs. 15 and 24) of the multiplier control circuit and close the normally opened switch 1269 of the division control mechanism, the closure of switch 1269 causing energization of the bias windings of a plurality of division bridge relays later described. At such time, the arm 1266b also opens the normally closed switch 1271 which is in the multiplication control circuit of the shift clutch solenoid 559 and closes the switch 1272 in an alternate circuit of this solenoid for control thereof during division. Thus the respective control circuits for the multiplication and division mechanisms are isolated from each other and are enabled selectively, depending upon the position of the auxiliary control slide 1266.

The leftward movement of the division control slide 1258 is operative to control the setting of a division control means including a division conditioning or setting lever 1281 (Fig. 20) and a division control arm 1282 (Fig. 18). The lever 1281 (Fig. 20) is pinned to a control shaft 1283 while the division control arm 1282 (Fig. 18) is freely pivoted thereon. The lever 1281 and the arm 1282 have respective opposed ears 1281a and 1282a which are connected by a spring 1284 (Fig. 17) so that either arm is spring-urged to follow movement of the other. The division setting lever 1281 (Fig. 20) is urged counterclockwise by a spring 1280 but is normally latched in the disabled position shown in Fig. 20 by a pair of latch members including a three-armed bell crank restart latch 1286 (Fig. 18) and a start latch lever 1291 (Fig. 20) both freely pivoted on the support shaft 1287. Restart latch 1286 (Fig. 18) is urged counterclockwise by spring 1279 and the horizontal leftwardly extending arm 1286a is notched to engage the ear 1281a to maintain the division setting lever 1281 in the normal disabled position shown. A downwardly extending arm 1286d secured to the hub of bell crank restart latch 1286 abuts the ear 1288a of the previously mentioned bell crank 1288 (Fig. 15) pivoted on the control slide 1258. Latch lever 1291 (Fig. 20), previously mentioned, is freely pivoted on the shaft 1287 and is biased counter-clockwise by a spring 1292. An ear 1291a on the lower arm of the latch lever 1291 abuts the ear 1288a of the bell crank 1288. Both of the latches 1286 and 1291 for the division setting lever 1281 are moved to release said lever upon movement of the division control slide 1258 and bell crank ear 1288a to the left as viewed in Fig. 15. A cam 1285 (Fig. 17) is related to an arm 1281b on the hub of lever 1281 and is driven by the main clutch to restore the lever 1281 to the position shown as explained hereinafter. The upper arm 1286b of the restart latch 1286 (Fig. 18) is operatively related to the cam 566 driven by the shift clutch as is more fully explained hereinafter.

Associated with the division control arm 1282 is a normally ineffective latch lever 1293 (Fig. 17) freely pivoted on the shaft 1287 and urged counter-clockwise by a spring 1294 against an arm 1295 pinned to the main clutch dog control shaft 508. When arm 1282 is released from latches 1286 and 1291 to rock counter-clockwise, as described above, then a subsequent rocking of the main clutch dog shaft 508 to clutch engaging position enables latch 1293 to lock the arm 1282 in its counter-clockwise position. In such position arm 1282 controls negative division operations through the operation of a plurality of switches 1317, 1318, 1319, and 1320 shown in Figs. 15 and 24 and which switches are more fully described hereinafter.

With further reference to Fig. 15, it will be noted that upon movement of the division setting slide 1258 to the left, i. e., to active position, that the bell crank 1288, after performing its function of moving the slide 1266 and the latches 1286 and 1291 to the above described positions, engages a stud 1296 and is rocked to and held in an inactive position against the urgency of its associated spring 1289 as long as slide 1258 is held in its leftmost position.

The division control arm 1282, after its original release from the latches 1286 and 1291, is automatically reciprocated under the control of various cams, described hereinafter, to open and close the above mentioned switches and thereby control division operations.

Means are provided for latching the auxiliary division control slide 1266 in its leftmost position and this means includes the latches 1301 and 1306 (Figs. 15 and 16). Latch 1301 is freely mounted on a shaft 1308 and is urged clockwise by the spring 1302 to normally lie on top of the ear 1266c (Fig. 16) of the auxiliary division slide 1266. Latch 1301 is provided with a laterally extending ear 1303 (Figs. 15 and 18) which, upon operation of the cam 566 (Fig. 18), is engaged by the depending arm 1286c of the bell crank latch 1286 to rock latch 1301 counter-clockwise as is more fully explained hereinafter. The second latching means for the division control slide 1266 is the broadfaced latch 1306 (Fig. 16) which is pinned to shaft 1308 and is urged clockwise to active position by the spring 1307 (Fig. 20). Latch 1306 normally lies on top of the ear 1266c of the auxiliary division slide 1266 previously referred to and also on top of an ear 1291a of the start latch 1291. Upon depression of the division start key 128 (Fig. 15), ear 1266c of link 1266 and ear 1291a of latch 1291 are moved to the left, at which time the latches 1301 and 1306 rock clockwise to active locking positions, the latch 1306 having its latching edge displaced to the left of the similar latching edge of the latch 1301 so that when the latch 1306 becomes effective with regard to the auxiliary division slide 1266, the latter is held spaced from the latch 1301 although the latch 1301 is in position to engage the slide 1266 if it is released from the latch 1306. Because of the width of the face of latch 1306, it is also effective to engage and hold the latch 1291 (Fig. 20) inactive when the latter is moved to its disabled position. Latch 1301 is employed at the end of a division operation as later described to insure a correct quotient figure by what is known in the art as "digit completion."

The movement of the start latch 1291 to its disabled position with respect to lever 1281 causes enabling of a dividend sensing mechanism hereinafter described. Simultaneously with the enabling of the division sensing mechanism, certain means for comparing the dividend with the divisor are also enabled, as will now be described. The latch lever 1291 (Fig. 20) is provided with a suitable hub 1291b carrying an auxiliary latch arm 1297 (Fig. 19) normally engaging an ear 1309a of a lever 1309. The latter lever is freely pivoted on the shaft 1283 and is urged counter-clockwise by a spring 1310. The upper end of the lever 1309 is pivotally connected to a control link 1311 (Fig. 15) the opposite end of which is pivotally connected at 1312 to an arm 1313 of the dividend sensing carriage generally designated at 1321 and which carriage is described hereinafter. Associated with the lever 1309 (Fig. 19) is a spring-urged bell crank 1315 having ears 1315a and 1315b. Ear 1315a is operatively related to the division conditioning lever 1281 (Fig. 17) and ear 1513b is operatively related to lever 1309 (Fig. 19). Bell crank 1315 cooperates with a cam 565 driven by the shift clutch to restore the levers 1291 and 1309 to the positions shown as will appear later.

The link 1311 (Fig. 15) is provided with an ear 1311a of insulating material adjacent the normally opened contacts of a switch 1314 which is in the circuit of the electrical division control circuit described more particularly hereinafter. The timing of the closing of switch 1314 by leftward movement of link 1311 is such that the switch is closed during the last portion of such movement.

Further conditioning of the machine for division is effected by the division control arm 1282 upon counter-clockwise movement from the position shown in Fig. 18 together with the division conditioning lever 1281, as previously described. Referring to Fig. 15, the division control lever 1282 is provided with a depending insulated arm 1282b which is positioned adjacent the extended arm 1316, one arm of a series of arms for switches 1317, 1318, 1319, and 1320. Referring to Figs. 15 and 25, it will be seen that with the division control mechanism in inactive condition and lever 1282 in clockwise position shown, the switch 1317 of the shift clutch solenoid circuit is closed and the double throw switch 1318 which is in the division control bridge circuit is in its left-hand position. Also, the switch 1319 which controls a counter compensation arm disabling magnet 1352 is open and the switch 1320 which controls the main reverse magnet 533 is also open. Upon counter-clockwise movement of the division control arm 1282 however, the condition of these switches will all be changed so that the conditioning switch 1317 is open, the division bridge switch 1318 is moved to the right to enable the division control circuit for quotient digit estimation and the counter compensation disabling switch 1319 and the main reverse switch 1320 are closed.

The counter compensation arm disabling magnet 1352 (Figs. 6 and 25) has a spring-urged armature 1353 (Figs. 6 and 7) carrying a key 1354 extending through a slotted portion of the compensator arm shaft 757 and engaging the bottom leg of a T-shaped slot 1355 in the hub 758a of the operating arm 758 (Fig. 5) for the shaft 757 described in the application S. N. 12,232. The key 1354 and the slot 1355 form a clutch connection which is normally engaged as shown, but which is disengaged by the energization of magnet 1352 so that the counter compensator arms are not affected by a rocking movement of arm 758 and remain enabled as long as switch 1319 is closed.

With the machine conditioned as described above division operations are carried out under control of certain division control mechanisms, as will now be described.

DIVIDEND SENSING CARRIAGE

Figure 8:
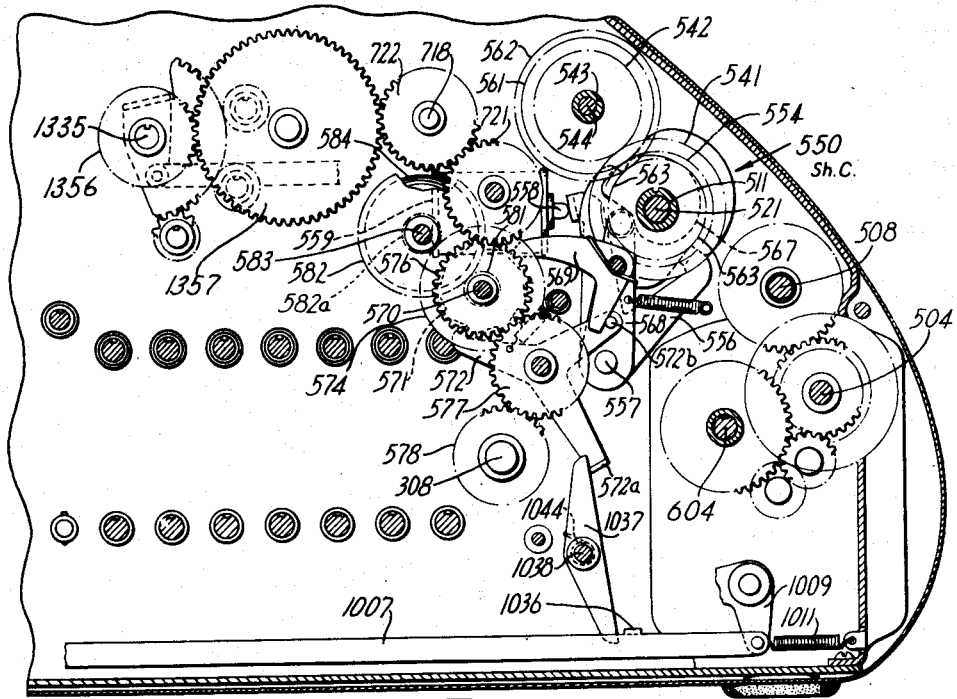
Fig. 8 is a right side sectional view of the shift clutch and associated mechanisms.
Figure 9:
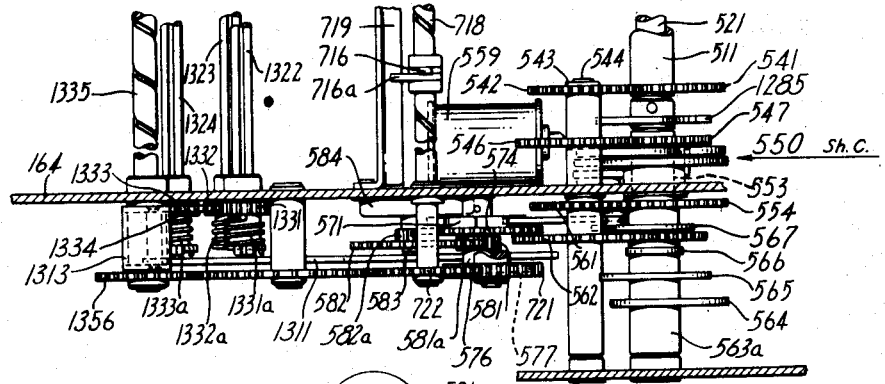
Fig. 9 is a fragmentary plan view of the shift clutch and associated mechanisms.

The dividend sensing mechanism comprises a dividend sensing carriage of the character disclosed in the above-identified application of Harold T. Avery, S. N. 81,501, to which reference is made for a disclosure of mechanism not described herein. In general this dividend sensing mechanism comprises a carriage or frame 1321 (Fig. 1) which is slideably mounted on three shafts 1322, 1323 and 1324 and which has a hub and pin engagement with a worm shaft 1335. Gears 1325, 1326, and 1327 are keyed to the shafts 1322 to 1324, respectively, and slide on these shafts with the carriage. The gears are ordinally spaced with respect to each other and each meshes with a respective one of the sensing gear segments 1328, 1329, and 1330. These gear segments are freely pivoted on the worm shaft 1335. Rotation of shaft 1335 effects ordinal shifting of the division sensing carriage. As seen in Figs. 8 and 9, shaft 1335 is driven through gears 1356, and 1357, and 722 forming a portion of the gear train driven by the previously described step by step movement of ratchet 571.

Gears 1325, 1326, and 1327 (Fig. 1) are yieldably driven through the respective shafts 1322 to 1324 by gears 1331, 1332, and 1333 (Figs. 9 and 15) which have respective spring drive connections 1331a, 1332a, and 1333a, as described in said Avery application, to each of the shafts 1322 through 1324, respectively, at the right-hand ends thereof. Gears 1331, 1332, and 1333 in turn mesh with and are driven by a common gear segment 1334, (Fig. 15) freely mounted on worm shaft 1335 and which segment is operated by the arm 1313 and the link 1311, as previously described.

As described in the above Avery application, the result of leftward movement of link 1311 is to drive the segments 1328, 1329, and 1330 (Fig. 1) yieldably until they are stopped by engagement with the respective aligned compensator arms 483 of the dividend register so that the position of these segments and correspondingly the respective positions of the shafts 1322 to 1324 will be representative of the positions occupied by the three aligned compensator arms. The compensator arms are positioned by their associated snail cams during the dividend value sensing operation and therefore the positions to which shafts 1322 to 1324 are rotated are representative of the values standing in the aligned numeral wheels of the dividend register. At their left-hand ends, the respective shafts 1322 to 1324 (Fig. 22) carry respective contact arms or brushes 1336, 1337, and 1338 cooperating with respective series of contacts 1339, 1340, and 1341 which form taps of respective variable resistors 1342, 1343, and 1344 (Fig. 25) forming part of a multiple Wheatstone bridge circuit indicated generally at 1345, all as is described in said Avery application.

From the above description it is seen that setting of the division sensing carriage operates in the manner disclosed in the above mentioned Avery application to enter the values standing in the three highest possible orders of the dividend into the bridge circuit for comparison with the values standing in the two highest orders of the divisor.

DIVISOR SENSING MECHANISM

Referring to Fig. 1, the two highest order numeral wheels 231 of the divisor factor indicator 192 have each integral therewith a contact arm 1346 (Fig. 2) cooperating with a series of contacts 1347 forming taps connected to respective variable resistors 1348, and 1349 (Fig. 25) so that these resistors will be adjusted to represent the two highest order digits of the divisor.

QUOTIENT ESTIMATION—WHEATSTONE BRIDGE

As previously stated, the division control circuits and more particularly the bridge circuits of the instant disclosure are identical in all respects to the similar circuits disclosed in the above noted Avery application, therefore, these circuits will only be briefly described here. The Wheatstone bridge illustrated in Fig. 25 includes two series of variable resistors R$dv$ and R$dr$. The three variable resistors 1344, 1343, and 1342 of the series R$dv$ are selectively set in accordance with the three leftmost or highest order digits of the dividend or current remainder, while the two variable resistors 1348 and 1349 of the series R$dr$ are selectively set in accordance with the two leftmost orders of the divisor as previously described.

The two series of resistors R$dv$ and R$dr$ are connected at point X which is, in turn, connected across the bridge to ten taps 0 to 9 on resistor R by ten parallel leads respectively numbered 0 to 9 in Fig. 24. The points of connection at the above taps are established by mathematical formulae disclosed fully in said Avery application and thus establish a plurality of different potentials at the taps on resistor R. The adjustments of the series of resistors R$dv$ and R$dr$ on the other hand establish a selected potential at point X which is representative of the ratio of the resistances in the two series of resistors. By means of the ten parallel leads and related instrumentalities the selected potential at point X is compared with the plurality of potentials on resistor R, and causes energization of a series of electromagnets including the one which is representative of the approximate value of the quotient of dividend and divisor, all as fully described in said Avery application.

The energization of this representative electromagnet in turn controls the number of cycles of operation of the actuating mechanism which subtracts the divisor from the dividend a number of times determined by the pre-estimated quotient digit.

Sensing for an overdraft is controlled in the following manner: A fixed resistor 1351 having resistance corresponding to numeral value of approximately 900 is connected in parallel with the divisor resistors 1348 and 1349, as explained in said Avery application, and the switch 1318 switches the resistors 1348 and 1349 out, and the fixed resistor 1351 into the bridge circuit so as to compare the fixed resistance of resistor 1351 with the value of the remainder of the dividend to determine whether an overdraft has occurred and corrective additive cycle is required, or whether the estimated quotient figure was correct and an ordinal shift is to be performed. Following an overdraft, the potential established at point X, by comparison of the R$dv$ with the fixed resistor 1351 will energize the number one bridge magnet 1361 (Fig. 24) to control a single cycle of operation of the actuating means while in case of non-overdraft the potential established at point X will determine energization of the zero magnet 1360, which in turn energizes the shift clutch solenoid 559 to cause shifting of the dividend remainder relative to the divisor.

In the arrangement of the multiple Wheatstone bridge embodied in the machines disclosed in the prior Avery application and also in the present disclosure, a series of bridge magnets 1360–1369 (Fig. 24) are energized in a rapid sequence or wave starting with the highest, namely, the #9 magnet, down to and including the one corresponding to the quotient digit.

In said Avery application the bridge magnets directly control the setting of a quotient selection mechanism, and are so arranged that the lowest numbered magnet of the series which is energized controls the quotient selection mechanism, the others above that one being ineffective even though their armatures are ejected.

The bridge magnets of the present machine, on the other hand, are purely relays which are energized in the wave exactly as in said Avery machine and include relay switches which are effective to cause energization of one magnet of the separate series of electro-magnets 851–859, which one of the magnets so energized corresponds to the lowest one of the series of bridge relays energized and becomes effective to differentially adjust the multicyclic latch for the main clutch according to the estimated quotient digit and correspondingly causes a pre-estimated number of cycles of operation of the main clutch, all as is fully described in the application S. N. 12,232.

DIVISION CONTROL CIRCUIT

The normally closed switches 1249 (Fig. 24) correspond to the switches of the same number in said Avery application and are opened upon operation of each of the respective relays 1360–1368. Each switch, when so opened, opens the circuit to the next higher relay and in so doing cuts out of the bridge circuit all the relays above the one which is representative of the selected quotient digit as described in said Avery application.

The switches which control selective energization of one of the magnets 851–859 mentioned above, each include a double throw switch associated with and operated by each respective bridge relay magnet 1360–1368. Each switch includes a normally closed pair of contacts such as those designated 1387a and a normally open pair of contacts 1387. The contacts 1387a are connected to the #8 buss 928, but the circuit including this buss is open at the contact 1388 of the #8 relay and also at the contact 1389 of the #9 relay.

When the Wheatstone bridge is adjusted and set into operation, (and assuming the quotient digit to be estimated is an 8), only the #9 and #8 relays become energized as described in the above mentioned Avery application. Upon such energization the contacts 1389 and 1388 are closed by their respective relay magnets and complete the circuit from the main power supply line 911, switch 1269, and lead 1402, to the closed contacts 1387a and the #8 buss line 928, and therefrom through the actuating winding 858b of the #8 magnet 858, the setting clutch solenoid 931, switches 519 and 648 to ground.

The similar circuit of the #9 magnet 857 is not closed because at the time the contacts 1388 were closed the contacts 1388a were opened. Similarly, the circuit for the #7 to #1 magnets 857–851 are not closed because the #7 relay 1367 was not energized and its contacts 1387 remained open. Thus only the #8 magnet 858 becomes energized under these conditions and controls the cyclic operation of the machine as described fully hereinbefore.

The bridge relays described above with reference to the wiring diagram are shown in Figs. 11 to 13 and have bias windings which are all energized by a common lead 1359 (Fig. 24) and actuating windings which are included in and selectively energized by the bridge circuits described above. Each relay includes an extension of its armature 1370 (Figs. 12 and 13) which carries an insulation member 1390. This member carries the movable contacts of the three pairs of contacts 1240, 1380, and 1380a, the zero relay being shown in Figs. 12 and 13 for illustration. When the relay is energized, the armature 1370 is moved toward the left as viewed in Fig. 13 and in so doing closes contacts 1380 and opens contacts 1240 and 1380a to close and open the circuits of the wiring diagram described above. The armatures of the bridge relays are normally held in the position shown in Fig. 11 by an armature holding slide 1391 which is brought to the position shown either by the setting clutch cam 614 (Fig. 25) or by the shift clutch cam 564, and latched in such position by a latch 1392. This latch is released by the energization of a solenoid 1394, the operation and purpose of which is described hereinafter. When the holding slide 1391 is released by the latch 1392 and moves toward the left, as seen in Fig. 11 the actuating windings of the division bridge relays which are energized by the bridge circuit overcome the energization of the bias windings and cause counter-clockwise movement of the armatures, whereas the armatures of those relays whose actuating windings are not energized will remain in the illustrated position after release thereof by the holding slide. In the case of a relay whose armature is rocked and the contact 1240 is opened, the circuit of the actuating windings of the next higher relays are opened; however, the armatures of these higher relays will remain in their rocked position even though their actuating windings are no longer energized because of the urge of the armature spring 867 and also because these armatures are out of the effective magnetic field created by the continuous energization of their bias windings. The circuits controlled by the other two pairs of contacts of these relays are therefore not disturbed.

DELAY OF SENSING OPERATIONS

It will be recalled that a compensating mechanism becomes operative upon completion of each agitating operation to align the numeral wheels. During division, the compensating mechanism normally operates to align the numeral wheels before a sensing operation is initiated. In case of an overdraft, however, the numeral wheels are changed from zeros to nines and thus cause a carry wave described in U. S. Patent No. 2,222,164 issued to Harold T. Avery. A mechanism is therefore provided for delaying each dividend value sensing operation for a period of time sufficient to allow any possible carry wave to be completed. In many cases, however, there will be no overdraft; therefore, a second mechanism is provided to supersede the delay mechanism and initiate a sensing operation when the values standing in certain orders of the dividend register indicate that a carry wave through those orders is not possible.

Sensing for either quotient pre-estimation or overdraft is controlled by the energization of solenoid 1394 (Fig. 25). As long as this solenoid is de-energized the armature holding slide 1391 is latched by latch 1392 and the armatures 1370-1379 are held in inactive position; therefore, the armatures cannot operate the switches associated therewith to start the next machine operation. This condition prevails even though the bias and actuating windings of the division bridge magnets may be energized as described hereinbefore.

With the machine conditioned for division as described hereinbefore, solenoid 1394 (Fig. 25) may be energized by the closure of any one of the three switches 1432, 1433, or 1434. Switch 1432 is under the control of a centrifugally operated brake mechanism which is provided for delaying the return of the numeral wheel centralizer levers until sufficient time has passed for the compensating mechanism to align the numeral wheels after an overdraft. This delay mechanism is operated as follows:

The shaft 468 (Fig. 1) for the centralizer levers 467 of the dividend register has journalled thereon a ratchet 1411 (Figs. 21 and 23) which is operated by a pawl 1412 carried by an arm 1413 secured to the shaft 468. The ratchet 1411 is secured to a gear 1414 meshing with a pinion 1415 which is integral with a gear 1416 (Fig. 23) these being journalled on the shaft 1417. The gear 1416 meshes with a pinion 1418 having its hub journalled on a stub shaft 1419 and carrying a gear 1420 which in turn meshes with a pinion 1421 freely mounted on the stub shaft 1417 and carrying a gear 1422 meshing with a pinion 1423. The pinion 1423 is journalled on the shaft 1419 and its hub carries a gear 1424 meshing with a pinion 1425 on the stub shaft 1417. The hub of the pinion 1425 carries a pair of oppositely disposed support arms 1426 having pivotally mounted thereon a pair of brake members or brake shoes 1427 (Fig. 21) adapted to engage within a brake drum 1428 secured to the stationary shaft 1417. The above gear train provides a stepped up drive for the brake shoes 1427 so that upon slight return movement of the centralizer shaft 468 and correspondingly of the compensator arms which are connected to this shaft, the pawl and ratchet drive 1412 and 1411 will drive through the above gear train to revolve the brake shoes 1427. The latter will revolve about the axis of shaft 1417 at a greatly increased speed and by centrifugal force will cause a braking action against the drum 1428, thereby retarding the return of the centralizer arms. The gear train is designed to provide a suitable delay in the return of the centralizer arms to allow time for a maximum carry wave to occur.

Also, in order to control the division operation, the arm 1413 has an extension 1431 of insulating material adapted, in the position of rest of the centralizers, to close switch 1432 (Figs. 21 and 25) to thereby energize solenoid 1394 and release the armature holding slide 1391. During an actuating operation, the centralizer arms are rocked out of engagement with their respective numeral wheel gears and switch 1432 is opened by such rocking movement.

The switches 1433 and 1434 (Fig. 22) are in parallel with switch 1432 (Fig. 25) and are controlled by the contact arms 1337 and 1338 of the second ("tens") and third ("units") orders of the active dividend comparing orders. The two switches 1433 and 1434 (Figs. 22 and 25) are opened when the second and third active dividend comparing orders stand at zeros. If a value of other than zero stands in either or both of these orders, however, the respective switch or switches 1433 and 1434 are immediately closed by the dividend sensing operation to complete the circuit to solenoid 1394. It will be seen that when a value of other than zero stands in either of these two orders that a carry wave of nines cannot occur and, therefore, there is no need to wait for the centrifugally controlled switch 1432 to close before energizing solenoid 1394. When these second and third orders both stand at zero, these zeros may be true values, or the zeros may be changed to nines by an overdraft carry wave. In either case the machine has no way of knowing whether or not an overdraft has occurred; therefore, the delaying mechanism shown in Fig. 21 holds the switch 1432 open for a length of time sufficient to allow a possible overdraft to occur. If and when such overdraft does occur, the switch arms 1337 or 1338 will be moved from their "0" to "9" positions and complete the circuit to solenoid 1394 whereas if the overdraft does not occur, these switch arms will not move from their zero positions and the solenoid 1394 will not be energized until the centrifugally controlled delaying mechanism closes switch 1432. The timing of the operation of the centrifugally controlled switch 1432 may be altered to meet the requirements of the individual machine, but in the preferred embodiment disclosed herein the time required for the closure of this switch is slightly greater than the time required for the completion of a maximum carry wave which is one in which the carry wave originates in that order of the dividend in alignment with the lowest order of the eight-order divisor and from this point of origin passes through the highest currently sensed order of the dividend.

The above described delay mechanism has been described with particular reference to delaying the operation of the machine when zeros appear in the second and third controlling orders of the dividend remainder after subtractive digitation. It will be seen, however, that the delay mechanism is equally effective with respect to delaying the operation of the machine when zeros appear in the controlling orders of the dividend remainder after a corrective plus stroke. On the other hand, in those cases where there is no overdraft and a corrective plus stroke is not initiated, the numeral wheels are aligned, at the latest during the shifting operation which follows the sensing of a non-over-draft condition and the centrifugally controlled switch 1132 is closed during such shifting to condition the machine for initiation of the next sensing operation as soon as the shift is completed.

It should also be noted that it is possible to eliminate the switch 1434 of the "units" order of the dividend remainder sensing mechanism and use only the single switch 1433 of the "tens" order for control of the solenoid 1394. In the latter case the delays caused by the use of a single order control would be increased nine fold. For example, the machine would be delayed when a zero appeared in the "tens" order regardless of whether or not the value in the units order were zero or a value from one to nine.

The above described mechanism for delaying a machine operation until the numeral wheels are properly aligned is disclosed as applied to a crawl carry register having an alignment mechanism of the type disclosed in the previously mentioned Patent No. 2,089,682, in which the numeral wheels may be changed from registration of "0" to "9" during the alignment operation, but the invention is also applicable to a crawl carry register having an alignment mechanism of the type disclosed in the Gooch Patent No. 1,246,087 issued Nov. 13, 1917, in which the numeral wheels may be changed from registrations of "9" to "0" by the aligning process.

The principal difference between these aligning mechanisms may be seen by referring to Fig. 1. The dividend register 100 has an aligning mechanism of the first mentioned type, while the register 101 has an aligning mechanism of the Gooch type. It will be noted that with the numeral wheels of both registers in their respective normal "0" positions, the compensating arm 483 of the dividend register 100 lies on the extreme high portion of its associated snail cam 482, whereas, the compensating arm 756 of the counter register 101 lies on the extreme low portion of its associated snail cam 724.

In each of these registers a crawl carry gearing between adjacent numeral wheels serves to advance each higher order numeral wheel in proportion to the advance of the next lower order numeral wheel. In the case of the dividend register 100, if a series of numeral wheels 461 have true values of "9" after actuation thereof, then the numeral wheels of this series each stand at substantially "0" due to the crawl carry gearing between the orders. In this case the machine does not know whether or not the "0's" are true "0's" or whether they will be changed to "9's," and the previously described delaying mechanism is operative to delay the next successive machine operation until the aligning process is completed.

In the case of the register 101 however, a series of numeral wheels which have true values of "0" after an actuation thereof stand in the "9's" position, as described in said Gooch patent. Therefore, if the aligning mechanism for the counter register 101 were substituted for use in the dividend register 100, then the delaying mechanism would be controlled in such a manner that when a series of numeral wheels each registered values of "9," the succeeding machine operation would be delayed until the aligning process either changed these "9's" to "0's" or until it is determined that these "9's" are true values. In the latter case the operation of the switches 1433 and 1434 (Fig. 25) would be such that they would be held open when the controlling orders thereof registered extreme settings of "9" and would be closed by the aligning movement of the numeral wheels from "9" to "0."

It will be understood that the centrifugally controlled delay of the centralizer arms is of general utility in registers embodying spring-driven tens transfer mechanism to insure a correct reading of the values when a carry wave occurs in any operation. This is true because a premature return of the centralizer arms can interrupt the spring-driven overdraft carry wave and cause an erroneous registration.

In machines employing "crawl type" tens carry mechanisms in the dividend register, sensing operations are dependent upon the proper alignment of the numeral wheels of this register; therefore, all of such sensing operations normally are delayed until the numeral wheels are properly aligned. From the foregoing description of the delay mechanism and related switches operated by such mechanism it will be seen that in the machine of the present disclosure there are no unnecessary delays for numeral wheel alignment except when zeros appear in the second and third highest orders of the dividend register, and in those cases where zeros do appear and then change to nines, the length of time of such delays is reduced to a minimum by mechanisms responsive to such a change.

In order to determine whether or not a delay control mechanism comprising three orders of the above described delay control switches would appreciably decrease the number of delays caused by the appearance of zeros in certain orders of the register, it is necessary to determine what remainder values may appear in the dividend register during the course of division operations.

The proportioning of the Wheatstone bridge as described in said Avery application No. 81,501, determines the point at which the different ratios of the dividend to the divisor cease to be pre-estimated as one quotient digit and are pre-estimated as the next higher or lower value quotient digit. Such proportioning, as shown hereinafter, has a limited effect upon the remainder values which may result from non-overdraft and overdraft registrations and also from a corrective plus stroke.

The following table of values shows the limits within which a given respective quotient digit will be estimated and beyond which limits the next higher or lower digit will be estimated, each estimation being dependent upon both the ratio of the dividend and divisor values selected and the proportioning of the resistors of the Wheatstone bridge. The specific proportioning may be altered or modified in any desired manner, in which case the values shown in this table would be changed in accordance with such modification. It is obvious therefore that the table is only illustrative of the embodiment shown.

*Table I*

| Quotients Pre-Estimated | Limits of Ratios of $\frac{Dvd}{Dvr}$ for each quotient | | Difference between quotient and lower limit | Difference between upper limit and quotient |
|---|---|---|---|---|
| Column A | Lower Limit, Column B | Upper Limit, Column C | Column D | Column E |
| 0 | 0 | —0.95 | 0 | 0.95 |
| 1 | 0.96 | —1.91 | 0.04 | 0.91 |
| 2 | 1.92 | —2.92 | 0.08 | 0.92 |
| 3 | 2.93 | —3.88 | 0.07 | 0.88 |
| 4 | 3.89 | —4.79 | 0.11 | 0.79 |
| 5 | 4.80 | —5.65 | 0.20 | 0.65 |
| 6 | 5.66 | —6.45 | 0.34 | 0.45 |
| 7 | 6.46 | —7.40 | 0.54 | 0.40 |
| 8 | 7.41 | —8.29 | 0.59 | 0.29 |
| 9 | 8.30 | —9.999999+ | 0.70 | 0.999999+ |

The above table is used in deriving the remainder values which are possible in division, and from which remainder values the frequency of the appearance of zeros in any given number of delay control orders may be determined. It should be understood, however, that the remainder values so derived may be changed by any variation of the limits shown in the above table but that the effect of such changes does not alter the underlying principle of the delay mechanism.

It will be seen from the above table that, with the exception of a zero pre-estimation, the estimated quotient digit may be somewhat less or somewhat greater than the actual ratio of the dividend or remainder to the divisor: for example, a quotient of 2 (Column A) is pre-estimated even though the ratio of $Dvd/Dvr$ is as small as 1.92 (Column B) or as great as 2.92 (Column C).

When the ratio $Dvd/Dvr$ is smaller than the pre-estimated quotient digit then an overdraft actuation will occur, and when the ratio $Dvd/Dvr$ is greater than the quotient pre-estimated then non-overdraft actuation will occur.

Since any remainder less than zero constitutes an overdraft, the minimum remainder value that may result when there is no overdraft is (000)00---0. On the other hand, the least possible amount of overdraft that may occur is caused by subtracting (from the current dividend) a divisor which exceeds the aligned dividend value only by a value of "1" in the lowest order thereof. In the latter case, the remainder has a value of —1, which is shown as a complementary value in the dividend register, or as (999)99--, which is the maximum possible overdraft remainder. The parentheses above and in the following description indicate the orders which are sensed and control the division mechanism.

*Maximum remainder after non-overdraft actuation*

The maximum remainder which may occur after non-overdraft actuation is a product of two factors:

(1) The maximum amount by which any ratio $Dvd:Dvr$ may exceed its respective estimated digital quotient before the next higher quotient is pre-estimated, and, (2) The value of the divisor.

It will be noted that the greater the ratio between the dividend and the divisor without causing the next higher quotient digit to be pre-estimated, the greater the remainder will be; therefore, the greater the divisor, the greater will be the maximum possible remainder for any given non-overdraft actuation.

From Table I, Column E, it will be seen that the greatest amount by which any given ratio $Dvd/Dvr$ exceeds its respective quotient pre-estimation without pre-estimating a higher quotient occurs for a quotient of "9," for which the upper limit may exceed the quotient estimated by a value of 0.9999+. It will be noted that a "9" is the highest possible quotient pre-estimation regardless of how high said ratio may be.

The greatest possible divisor in the present machine is (99)999999, there being eight divisor orders.

Therefore, if factor (1), above, times factor (2) is the greatest theoretical remainder after non-overdraft actuation, then the value of the same is .999999+ times (99)999999=(99)999---, which appears in the dividend register as (099)999--.

*Minimum remainder after overdraft actuation*

The maximum amount of overdraft which may occur results in a minimum overdraft (negative) remainder which is a product of two factors:

(1) The maximum amount by which any pre-estimated quotient digit exceeds its lower limiting ratio $Dvd/Dvr$ and below which ratio value the next lower quotient digit is pre-estimated.

(2) The value of the divisor.

It will be noted that the maximum possible amount of overdraft is caused by a maximum divisor value.

As seen from Table I, Column D, the greatest difference between a quotient and its limiting lower ratio Dvd/Dvr occurs for a quotient of "9" in which said difference is 0.70. As seen in Column B the lower limiting ratio for a quotient of 9 is 8.3. With a sensed divisor of (99) the least possible dividend value which may be compared therewith to obtain a quotient pre-estimation of "9" is 99×8.3=821.7, or, when expressed as a rounded out whole number, it becomes (822). Therefore assume:

$$\text{Dividend value} = (822)000000$$
$$\text{Divisor value} = (99)000000$$

A quotient of "9" is pre-estimated and if the
dividend value= (822)000000
and the value 99×9 is subtracted therefrom: −891
the remainder=999(931)000

It will be noted that the actual values of both the dividend and divisor may exceed the respective values that are sensed by the respective sensing mechanisms. Assuming that the unsensed orders of the divisor each stand at a maximum value of "9" while the unsensed orders of the dividend remain at "0" then in the above example, the remainder may be somewhat less than the value (931). For example:

Dividend= (822)000000
Divisor = (99)999999

A quotient of "9" is pre-estimated and    (822)000000
− (9×99999999)=    −    899 999991

Remainder =    9(922)000009 which is the minimum possible remainder after an overdraft.

The maximum values standing in the unsensed orders, of either the dividend or divisor, are at most equal to a value of approximately "1" in the lowest sensed orders thereof. For example: The values (---)9999--- and (--)999 are equal to approximately (001) and (10) respectively. Such a small difference between the actual and the sensed dividend causes no error in the final quotient because, at worst, it will only result in a higher remainder value standing in the dividend register after actuation, while an error of "1" between the actual and the sensed divisor will, at worse, cause an overdraft which is subsequently sensed and corrected as previously described.

*Remainders after corrective plus stroke*

With regard to remainder values after a corrective plus stroke, it will be seen that the conditions which produce the least amount of overdraft also produce the greatest remainder value after a corrective plus stroke: and conversely, the conditions which produce the greatest amount of overdraft also produce the smallest remainder value after a corrective plus stroke.

The least amount of overdraft, as described above, is caused by subtracting a divisor from the current dividend of a value of only "1" more than the dividend.

For example assume:

a dividend value of:    0(080)006972
and a divisor value of:    (80)006973

In this case a "1" is pre-estimated to cause a single subtractive cycle and a remainder of a value of −1 results, which, as seen in the dividend register, reads 9(999)999999. After the corrective plus stroke, the remainder value reads as (080)006972 again. From this example it will be seen that the larger the divisor which will cause an overdraft by −1, the larger the remainder will be.

Therefore, assume:

a dividend of:    (099)999998
a maximum divisor of:    (99)999999

By following through an overdraft and a corrective plus stroke as shown in the previous example, the maximum remainder possible is (099)999998.

The minimum overdrafted remainder as shown hereinbefore, is approximately 9(922)00--- and by adding the divisor value which was used in deriving this overdraft to the overdraft remainder, the minimum remainder after a corrective plus stroke is determined.

Maximum overdraft remainder=    9(922)000009
Maximum divisor    ÷    99 999999

Minimum remainder    =    (022)000008

The range of remainders after a corrective plus stroke therefore extends from (022)00-- to (099)99--. However, the machine effects an ordinal shift during the corrective plus stroke so that this range of values reads 0(220)0-- to 0(999)9-- at the time the next ordinal sensing operation for quotient pre-estimation is initiated.

It will be recalled that, whenever necessary, division operations are delayed after an actuation until the numeral wheels are aligned, but if some digit other than zero appears in either or both the second and third sensed orders of the dividend, a switch 1433 or 1434 (Fig. 25) is closed and such delay is eliminated.

The foregoing derivation of remainder values is significant in determining the advisability of placing a third switch (such as switches 1433 and 1434) under the control of the highest sensed order of the dividend in view of eliminating some of the delays caused by a two order control mechanism. To facilitate an analysis of the results caused by such a third delay switch, the remainder values possible in the course of division operation have been grouped as follows:

*Group A.—After non-overdraft actuation*

Maximum remainder=(099)99---
Minimum remainder=(000)00---

*Group B.—After overdraft actuation*

Maximum remainder (expressed
 as a complementary value)=9(999)999--
Minimum remainder (expressed
 as a complementary value)=9(922)00---

*Group C.—After corrective plus stroke (and shift)*

Maximum remainder=(999)99---
Minimum remainder=(220)00---

Group A includes only 100 possible remainders within the sensed orders of the dividend, and of these remainders, zeros appear in the two disclosed sensing delay orders only when: (a) a minimum remainder value of (000) occurs, or (b) a maximum remainder value of (099) is followed by some digit great enough to change the "9's" to some intermediate values between "9" and "0" which are sensed as zeros. In such a case, the value (099)9 would read (100) before numeral wheel alignment. With the arrangement of the present embodiment, in which there are only two delay control switches, the operation of the machine thus is delayed by only two remainders of the hundred remainders possible in Group A namely (000) and (100) and even if a third order delay switch were added to the present arrangement the operations of the machine would still be delayed upon the occurrence of the value (000).

In Group B the range of remainder values extends from 9(922)00-- to 9(999)9, and of these values, zeros appear in the two delay control orders of the present embodiment only when some digit following the value 9(999) is large enough to change this value to 0(000)0--. In the latter case, a zero also appears in the highest sensed order of the dividend; therefore, the provision of an additional delay control switch in the highest sensed order of the dividend would not afford the elimination of any delays which are possible with the two order switch arrangement of the preferred embodiment.

In Group C the range of remainders extends from (220)00-- to (999)99-- or a total of 780 possible remainders. These remainders include the values (299)9, (300), (399)9, (400), (499)9, (500), (599)9, (600), (699)9, (700), (799)9, (800), (899)9, (900), and (999)9, in all of which remainders, zeros stand in the two delay control orders before alignment of the numeral wheels. The remainders of (300), (400), etc., up to (900) invariably cause the two ordinal switches 1433 and 1434 (Fig. 59) to remain open and delay machine operations until the centrifugal brake control switch 1432 is closed. Such delays could be eliminated with a three order switch control. In the case of remainders (299)9, (399)9, etc. to (899)9 which read (300)9, (400)9 etc. up to (900)9 before numeral wheel alignment, the zeros are changed to "9's" by the alignment of the numeral wheels.

In this respect it should be noted that the time required after an actuating operation to close switch 1395 (Figs. 5 and 25) in the circuit of the aforementioned delay control circuit is sufficient to allow alignment of the numeral wheels including a two order alignment of a series of "0's" to "9's." For example, with a dividend value of (299)90, the value displayed before numeral wheel alignment is (300)9. Then during the aligning process the "9" in the value (300)9 directly causes the adjacent leftward "0" to be backed up to a "9."

The second leftmost "0," however, is not changed to a "9" until the first "0" is changed to a "9" by the aligning process. Therefore, there is a slight delay in aligning the leftmost "0" to the value "9," and which delay may be termed a "one order carry-over."

Since the values (099)9 etc. to (899)9 are aligned by a one order carry-over within the time prescribed for the closure of the aforementioned switch 1395 (Fig. 59), no delays are caused by the occurrence of the last described remainders (099)9 etc. to (899)9. On the other hand, if a series of "9's" stand in the lower orders of the remainders adjacent the sensed orders, for example: (099)99999, (199)99999, etc. to (899)-99999, then these values read (100)00009, (200)-00009 etc. to (900)00009 before numeral wheel alignment and such alignment is delayed for a length of time corresponding to the number of orders of zeros which must be changed to nines by a carry wave. In any case, however, the time required to change a series of "0's" to "9's" is less than that required to close the centrifugal brake controlled switch 1432.

After a corrective plus stroke, therefore, it will be seen that with the exception of the delays caused by the value (999)999--which reads (900) before numeral wheel alignment, all the delays shown in the preceding examples may be eliminated by a three order delay control mechanism. The elimination of such delays after a corrective plus stroke may in some cases, cause sensing of dividend values while the numeral wheels are in the process of alignment. For example: With the positive remainder of (099)9 after a corrective plus stroke, this value reads (100)9 before numeral wheel alignment. Sensing of a value of (100) rather than (099) does not cause a miscalculation as shown hereinbefore, but if the dividend and divisor sensing operations determine the quotient estimation while the numeral wheels are in the process of alignment, then a value such as (109) may be sensed and thereby determine an overestimation of the quotient, the term "overestimation" being an estimated quotient digit which is greater than the ratio of the dividend to the divisor. In such a case, an overdraft would occur, the correction of which requires more time than the time that could be saved by the provision of a three order delay mechanism.

An alternative manner in which a third delay control switch may be provided is to place a switch under the control of the value standing in the first order to the right of the three sensed dividend register orders. A third delay control switch in such a location would reduce the number of delays but the same objection that applied to a third delay control switch in the highest sensed order also applies to an additional control switch in the first order to the right of the sensed orders, namely: a dividend sensing operation occurring during alignment of the numeral wheels might cause an overestimation of the quotient and thus result in more overdrafts than normally result.

Therefore, regardless of whether a third order sensing delay control switch be provided and responsive to the values standing in the highest sensed order of the dividend register, or responsive to the value standing in the first order to the right of the third sensed order of said register, the saving in time due to the number of delays eliminated by such provision is small compared to the number of remainders which do not cause delays. Also, in consideration of the objections to a third order delay mechanism, as presented above, the two order delay control mechanism has been selected as the preferred embodiment for illustrating the present invention.

DIVISION STOP CONTROL

A division stop mechanism is provided for stopping the operation of the machine at the conclusion of quotient determination. The operation of this stop mechanism may be initiated by a division stop solenoid which automatically becomes energized during the last ordinal division operation, or it may be initiated by the depression of a division stop key during any ordinal operation.

A stop solenoid 1450 (Fig. 15) is suitably mounted adjacent the stop key 127 and is provided with a plunger-type armature 1452 which is ejected when the solenoid is energized. The armature 1452 overlies an ear 1453a of an arm 1453 fixed to a shaft 1454. Shaft 1454 carries a depending arm 1456 which is pivoted to one end of a division stop link 1457. Link 1457 extends rearwardly of the machine and has a slotted connection with an arm 1458 (Figs. 15 and 16). Arm 1458 is fixed to shaft 1308 which is integral with the previously described latch 1306.

When the solenoid 1450 is energized, the latch 1306 (Fig. 20) is moved counter-clockwise to inactive position to release the latch 1291 and also to release ear 1266c of the division slide 1226 (Fig. 16). Upon such release, ear 1266c moves into engagement with and is held by the latch 1301. Meanwhile, start latch 1291 (Fig. 20) and arm 1297 (Fig. 19) integral therewith rock counter-clockwise for locking the division conditioning lever 1281 (Fig. 20) and the dividend sensing carriage control lever 1309 (Fig. 19) respectively, in the positions shown in Figs. 17 and 19, when these levers are restored to these positions by the respective cams 1285 and 565. Cam 1285 (Fig. 17) is driven by the main actuator drive clutch and normally restores the division conditioning lever 1281 to the position shown in Fig. 17; however, when a "0" is pre-estimated in a given order, the main clutch is not operated and lever 1281 is restored through ear 1315a of bellcrank 1315 (Fig. 19) which is operated by cam 565 during the shift cycle. Cam 565 and bell crank 1315 operate through ear 1315b to restore control lever 1309 to the latched position shown.

Operation of the cam 566 (Fig. 18) during the last shift cycle rocks bell crank arm 1286b so that arm 1286c engages ear 1303 of latch 1301 (Fig. 16) and rocks the latch 1301 to inactive position, thus releasing slide 1266 from restraint of the latter latch. Slide 1266 (Fig. 15) moves under the urgency of its spring 1267 to its rightmost position and releases the latch 1256 from the division start key 128 which, in turn, allows return of the division control slide 1258 to normal position. In this way all of the parts are restored to their inactive positions as illustrated in Figs. 16 to 20.

It will be noted that latch 1301 (Fig. 16) is rocked counter-clockwise during each ordinal operation of the shift mechanism, but that it does not exercise any control over slide 1266 until after that slide has been released from latch 1306.

Figure 10:
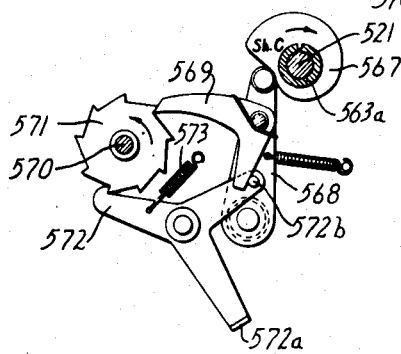
Fig. 10 is a detailed view of a portion of the shift drive mechanism shown in Fig. 8.

The control of the solenoid 1450 (Fig. 15) at the end of a complete division operation is exercised by a set of normally opened contacts 1455 (Fig. 25) and a cooperating cam 1460, the hub of which, as shown in the application 12,232, is pinned to shaft 570 driven by the advance of the shift ratchet 571 (Fig. 10). The cam 1460 (Fig. 25) is angularly positioned on shaft 570 so that it will become effective to close switch 1455 during the shift cycle following the last ordinal division operation. In this way solenoid 1450 is energized and the automatic stopping of the division mechanism is effected after a complete division operation.

If it is desired to terminate a division operation before the full capacity quotient figure is determined, the division stop key 127 (Fig. 15) is operated. The key 127 is urged to raised position by a spring 1461 and has an ear 1462 overlying the arm 1453 previously described in connection with the automatic division stop control mechanism. Thus upon depression of the division stop key 127, the same train of parts previously described, including the arms 1453 and 1456, the link 1457 and the latch 1306, are operated to bring the operation of the machine to an end after the shift clutch cycle following the ordinal division operation during which the stop key is depressed.

DIVISION OPERATION

In describing the operation of the machine in performing division problems, it will be assumed that the dividend has been entered as described in connection with the dividend key 126 and that the divisor has been entered in the selection storing carriage as described previously, and that the actual division operation is initiated by depression of the division start or equal key 128.

Referring to Fig. 15, it will be recalled that depression of the equal key 128 operates through the arms 1253 and 1255 to draw the division control link or slide 1258 together with the auxiliary division control link or slide 1266 forwardly or to the left as viewed in Fig. 15 and that the latch arm 1256 becomes operative to hold the equal key 128 in depressed position.

Operation of the division control slides 1258 and 1266 (Fig. 15) momentarily moves the latch 1301 into latching engagement with the slide 1266 and thereafter brings into play the latch 1306 which holds the slide 1266 to the left of the position in which it would be held by the latch 1301. As later described, the latch 1301 becomes effective again only during the last ordinal division operation to insure the last quotient digit completion.

The leftward movement of the auxiliary division control slide 1266 (Figs. 15 and 24) closes the main division control switch 1269 at the same time that it opens the main multiplier control switch 912. The closing of the switch 1269, through leads 1402 and 1359, (Fig. 24) energizes the bias windings 1360b–1369b, and through leads 1402 and 1404 (Fig. 25) it energizes the temporarily inactive bridge circuit 1345. The switch 1269 also closes a circuit through leads 1402 and 1403 to energize the counter reverse solenoid 749 and also connects the following switches to the main line 911: (1) the temporarily open switch 1320 (Fig. 25) for the main reverse solenoid 533, (2) the temporarily open switch 1319 for the counter compensation arm disabling solenoid 1352, (3) the temporarily closed shift circuit switch 1317, and (4) the temporarily open switch 1314 of the delay control circuit including the switches 1432, 1433, and 1434. This movement of the slide 1266 (Figs. 15 and 24) also serves to open the multiplier control switch 1271 and to close the switch 1272. The latter switch conditions the circuit of the shift clutch solenoid 559 for control thereof by means of switch 1317 (Fig. 25) and switch 630 (Fig. 24).

The leftward movement of the division control slides 1266 and 1258 (Fig. 15) also serves to disable the latches 1291 and 1286, and thereby release the division conditioning lever 1281. The latter moves counter-clockwise from the position shown in Fig. 18 and through ear 1281a carries with it the division control arm 1282. As later described, this movement of the control arm 1282 operates switches which control various operations of the machine in division.

The disabling of latch arm 1297 (Fig. 19) integral with the start latch 1291 releases the sensing control lever 1309 to move counter-clockwise. Link 1311 (Figs. 19 and 15) connected to lever 1309 is moved toward the left to operate the division sensing gear sector 1334 (Fig. 15) and to close switch 1314 (Fig. 25) of the sensing delay circuit. The gear sector 1334 (Fig. 15) drives the ordinal sensing control gears 1331—1333 and moves the gear sectors 1328, 1329, and 1330 (Fig. 1) against the compensator arms 483 to thereby sense the values of the three highest orders of the dividend, the compensator arms being engaged with their associated cams at this time.

The division control arm 1282 (Fig. 15) in setting the machine for division, operates the switches 1317, 1318, 1319, and 1320 (Figs. 15 and 25) to close their respective circuits described hereinbefore. At this time the bridge circuit 1345 (Fig. 25) is active to compare the three highest dividend digits with the two highest divisor digits to obtain a pre-estimated quotient digit and when the switch 1314 of the sensing delay control circuit is closed, a circuit is completed through the centrifugally controlled switch 1432 which is closed at the start of division, and the normally closed switch 1395 (Figs. 5 and 25) so that solenoid 1394 is energized and the latch 1392 (Fig. 25) for the armature holding slide 1391 (Fig. 11) is disabled, the slide 1391 moving to the left to released position to release the armatures for the series of bridge magnets. The release of the bridge magnet armatures controls energization of one of the busses 920-929 (Fig. 24) as previously described.

Assuming that the No. 9 buss 929 is energized, such energization energizes the setting clutch solenoid 931 (Fig. 24) to cause engagement of the clutch and to cause utilization of the actuation control circuit to effect nine cycles of subtractive operation, the main reverse solenoid 533 being energized at this time as described above. Since the counter reverse solenoid 749 (Fig. 25) is energized throughout division operations, a count of nine is positively entered into the highest order of the quotient register during nine subtractive cycles of operation of the differential actuators.

The setting clutch operates through the cam 618 (Fig. 5), follower 488, and link 487, to move the compensation arms 483 out of engagement with their cooperating snail cams to permit movement thereof, and the associated numeral wheels 461 without retraint by the compensation arms.

Upon operation of the main clutch, the follower 488 and link 487 are locked in this compensation arm disabling position by a latch 491 which is enabled by engagement of the main clutch and remain so locked until the main clutch becomes disengaged. In this locked rearward position of the link 487 the switch 1395 (Fig. 25) is held open thus breaking the circuit to the armature release solenoid 1394 so that this solenoid cannot be energized again during the operation of the main clutch.

The setting clutch operates through cam 614 (Fig. 25) to restore the bridge magnet armature control slide 1391 into latched relation with its latch 1392 so that the bridge magnet armatures are held in their normal inoperative position prior to the next sensing operation. The setting clutch also operates through the cam 613 (Fig. 5) to rock the main clutch dog shaft 508 clockwise to engage the main clutch 514. The clockwise movement of the main clutch dog shaft 508 (Fig. 17) moves the arm 1295 clockwise thereon to trip the latch 1293 and release the division control arm 1282 for movement to the position shown shortly before the cam 1295 operates through the arm 1281b to move the division conditioning lever 1281 clockwise and back into position to be latched by the restart latch 1286 (Fig. 18). The latching of arm 1282 and the clockwise movement of lever 1281 tensions the spring 1284 (Fig. 17) and places the division control arm 1282 under spring tension to follow the division conditioning lever 1281 to normal plus position shown. When the main clutch dog moves to clutch disengaging position at the end of the pre-estimated nine cycles of operation, the latch 1293 for arm 1282 is rocked clockwise to inactive position by the arm 1295 on the main clutch dog shaft 508, and lever 1282 rocks clockwise to follow lever 1291.

The return of the division control arm 1282 again closes the shift control switch 1317 (Fig. 25) and it throws the arm of the double throw switch 1318 to the left to enable the bridge circuit for a comparison of the value of the resistor 1351 with the resistors 1342 to 1344 which contain the remainder of the dividend. If an overdraft has occurred, as is assumed in this case for purpose of illustration, then the remainder may be some value between 9(922)00-- and 9(999)99--. It will be recalled that either of the switches 1433 or 1434 is closed to energize solenoid 1394 when a value other than "0" appears in a delay control order, which is the case when values other than 9(999)99 occur after an overdraft. With a remainder of 9(999)99--, however, the delay control orders both stand at "0" before numeral wheel alignment. In the latter case, the energization of solenoid 1394 (Fig. 25) to release the armature holding slide 1391 is delayed as explained hereinbefore until the numeral wheel aligning mechanism changes the zeros to nines and closes switches 1433 and 1434 to energize solenoid 1394 and release the armature holding slide 1391. At such time the comparison of any overdraft remainder value between 922 and 999 in the resistors 1342—1344 with a value of 900 in resistor 1351 determines a ratio of approximately "1" and closes the circuit for the No. "1" buss 921 which causes operation of the setting clutch which, in turn, causes engagement of the main clutch. It will be recalled that at this time the switch 1320 (Fig. 25) is open and the main reverse magnet 533 is therefore de-energized so that a positive entry of the divisor value occurs and a single negative entry is made into the counter register to change the "9" previously registered therein to an "8." As the shift control switch 1317 is also closed, the circuit of the shift clutch solenoid 559 (Fig. 24) is enabled and when cam 619, driven by the setting clutch, closes switch 630, the shift clutch is operated to effect a one-step ordinal shifting movement of the selection storing carriage, the dividend sensing carriage, and the counter actuator interponent. This shifting operation will occur during the overdraft correction cycle to condition three shiftable devices for next lower ordinal division operation.

During the operation of the shift clutch, the cam 563 driven thereby (Fig. 18) rocks the arm 1286b of the restart latch 1286 to disable this latch to permit the division conditioning lever 1281 and the division control lever 1282 to again move, under tension of spring 1280, to the counter-clockwise position they assumed upon depression of the division start key 128. Also, the cam 565 (Fig. 19) becomes operative to rock the restoring bell crank 1315 for the control lever 1309 of the division sensing carriage immediately at the beginning of the shift cycle so that the sensing sectors are out of the way for the shifting operation. Furthermore, the shift clutch cam 564 (Fig. 25) operates through the arm 1398—1399 to again restore the bridge magnet armature control slide 1391 into latched relation with its latch 1392 so that the parts are again conditioned as at the start of the division operation.

The above operations proceed order by order until the complete quotient figure is determined.

When the cam 1460 (Fig. 25) operated by the shifting mechanism becomes effective to close the associated contacts 1455, the division stop solenoid 1450 (Fig. 15) is energized to project its armature 1452 and operate the arm 1453 and the link 1457. In this way, the latch 1306 is moved to inactive position and the slide 1266 can move into engagement with the auxiliary stop latch 1301. At the same time, the start latch 1291 for the division conditioning lever 1281 is released from the control of latch 1306 to lock the lever 1281 in the plus position shown in Figs. 17 and 20. Also when the restart latch 1286 is operated by the cam 566 (Fig. 18) the lower arm 1283c contacts ear 1303 of latch 1301 and trips that latch during the shift cycle to free the division control slides 1258 and 1266 so that the division mechanism is restored to normal condition.

I claim:

1. In a calculating machine having a register, actuating means for entering a value into the register, division control means including an ordinally shiftable value sensing carriage adjustable under control of said register for controlling ordinal dividing operations, and means responsive to the division control means for effecting a complete ordinal shift of said sensing carriage relative to said register during the value entering operation of said actuating means to bring said value sensing carriage into the proper ordinal position for the next ordinal dividing operation.

2. In a calculating machine having a register and actuating means for entering values into the register, division control mechanism including means for effecting a positive correction cycle of said actuating means following an overdraft of the register, a selection storing carriage ordinally shiftable with respect to said actuating means for controlling entry of values therein, and means responsive to said division control mechanism to cause shifting of said selection storing carriage concurrently with the value entering operation of said actuating means during an overdraft correction cycle.

3. In a calculating machine having a plural order register and plural order actuating means for entering values into the register, division control mechanism including means for effecting a positive correction cycle of said actuating means following an overdraft of the register, a plural order selection storing mechanism associated in relation to respective orders of said actuating means and operable to control entry of values therein, devices for changing the ordinal relation between the storing mechanism and the actuating means, and means for initiating and completing the operation of said devices concurrently with the value entering operation of said actuating means during an overdraft correction cycle thereof.

4. In a calculating machine having devices for receiving the divisor of a division calculation, a crawl carry register for receiving the dividend, said register including a plurality of numeral wheels and a plurality of members therefor each graduated to correspond to a plurality of values ranging from one to another extreme of a series of values registered on a respective numeral wheel, and actuating means for said register; the combination of, division mechanism for dividing the amount registered in said dividend register by the amount entered in said divisor receiving devices including, means for causing negative operation of the actuating means to subtract the divisor from the dividend, and means for initiating a plus correction operation of the actuating means to add the divisor to the dividend, with correction control means including mechanism for sensing one or more of said members and operable under control thereof when said members stand at one of said extreme range of values to delay operation of the initiating means.

5. In a calculating machine having a crawl carry register including a plurality of numeral wheels, and actuating mechanism therefor, a plurality of members each graduated to correspond to a plurality of values ranging from one to another extreme of a series of values registered on a respective numeral wheel, and mechanism operable under control of said members to align said numeral wheels to full digital display positions; the combination of, division mechanism operable through a plurality of division operations including operation of said actuating mechanism, means for initiating a succeeding operation of the division mechanism, with means controlled by one or more of said members when the same stand at one of said extreme range of values at the end of the operation of the actuating mechanism to delay operation of said initiating means, and means operable under control of one of said members for rendering said delay means ineffective when said one member is moved from the position corresponding to said extreme range during operation of the numeral wheel aligning mechanism.

6. In a calculating machine having devices for receiving the divisor of a division calculation, a crawl carry register for receiving the dividend, said register including a plurality of numeral wheels and a plurality of members therefor each graduated to correspond to a plurality of values ranging from one to another extreme of a series of values registered on a respective numeral wheel, and actuating means for said register; the combination of, division mechanism for dividing the amount registered in said dividend register by the amount entered in said divisor receiving devices including, means for causing negative operation of the actuating means to subtract the divisor from the dividend, and means for initiating a plus correction operation of the actuating means to add the divisor to the dividend, with correction control means including mechanism for sensing one or more of said members and operable under control thereof when said members stand at one of said extreme range of values to delay operation of the initiating means, and means operable at a predetermined time in the sequence of division operations to supersede said delay mechanism and to cause operation of said initiating means.

7. In a calculating machine having a plural order register for receiving a dividend, plural order actuating means for said register, a device for receiving a selected divisor including mechanism for adjusting said actuating means in accordance with the value of said divisor; division mechanism controlled jointly by respective controlling orders of said register and said receiving device to perform a division calculation, said mechanism including means for establishing representations of the dividend and divisor values in said respective controlling orders of the register and receiving device, means for sensing the remainder of the dividend at the end of an ordinal division calculation, means controlled by said sensing means to delay the succeeding operation of said division mechanism when the remainder value sensed in said controlling orders of the register is "zero" or to initiate said succeeding operation when said remainder value is other than zero, and timing mechanism operable at a pre-determined time to initiate said succeeding operation when such operation is delayed by said delaying means.

GEORGE V. NOLDE.

REFERENCES CITED

The following references are of record in the file of this patent:

UNITED STATES PATENTS

| Number | Name | Date |
|---|---|---|
| 2,211,736 | Avery | Aug. 13, 1940 |
| 2,339,616 | Chase | Jan. 18, 1944 |
| 2,374,333 | Crosman | Apr. 24, 1945 |
| 2,378,560 | Kiel | June 19, 1945 |